United States Patent
Barnes et al.

(10) Patent No.: US 9,843,911 B2
(45) Date of Patent: Dec. 12, 2017

(54) REMOTELY ACTIVATED MONITORING SERVICE

(71) Applicant: AT&T Intellectual Property I, L.P., Atlanta, GA (US)

(72) Inventors: Bruce Barnes, Pingree Grove, IL (US); Christopher Baldwin, Algonquin, IL (US); Wayne Robert Heinmiller, Elgin, IL (US); Patrick Kenny, Barrington, IL (US); Susan Kenny, Barrington, IL (US); Dolores J. Mallian, St. Charles, IL (US); Nikhil S. Marathe, Roselle, IL (US); Michael Towster, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 685 days.

(21) Appl. No.: 14/033,670

(22) Filed: Sep. 23, 2013

(65) Prior Publication Data

US 2015/0087258 A1    Mar. 26, 2015

(51) Int. Cl.
*H04M 3/00* (2006.01)
*H04W 24/00* (2009.01)
*H04W 4/22* (2009.01)
*H04W 4/02* (2009.01)

(52) U.S. Cl.
CPC ............. *H04W 4/22* (2013.01); *H04W 4/028* (2013.01)

(58) Field of Classification Search
CPC ......... G06K 2017/0745; G06Q 10/087; G06Q 50/265

USPC ............................................ 455/404.2, 456.3
See application file for complete search history.

(56) References Cited

U.S. PATENT DOCUMENTS

| | | | |
|---|---|---|---|
| 6,362,778 B2 | 3/2002 | Neher | |
| 6,559,769 B2 | 5/2003 | Anthony et al. | |
| 6,697,103 B1 | 2/2004 | Fernandez et al. | |
| 7,221,928 B2 | 5/2007 | Laird et al. | |
| 7,812,711 B2 | 10/2010 | Brown et al. | |
| 7,880,767 B2 | 2/2011 | Chinigo | |
| 7,907,931 B2 | 3/2011 | Hartigan et al. | |
| 7,920,891 B2 | 4/2011 | Kwak | |
| 8,045,482 B2 | 10/2011 | Davis et al. | |
| 8,447,265 B2 | 5/2013 | Flippo et al. | |

(Continued)

OTHER PUBLICATIONS

Carahsoft Technology Corp., "Intelligence Solutions for Government From Carahsoft," www.carahsoft.com/omnilink/, accessed Aug. 20, 2013.

(Continued)

*Primary Examiner* — Joshua Schwartz
(74) *Attorney, Agent, or Firm* — Hartman & Citrin LLC

(57) ABSTRACT

Concepts and technologies are disclosed herein for a remotely activated monitoring service. The monitoring service can be executed by a server computer. The server computer can detect an event associated with a user device. The server computer can determine that monitoring of a proximity of the user device is to be initiated based upon the event. The server computer can determine a geographic location of the user device and identify monitoring hardware that is to monitor the proximity of the user device. The server device also can issue a command to the monitoring hardware to initiate monitoring of the proximity of the user device by the monitoring hardware.

20 Claims, 11 Drawing Sheets

(56) References Cited

U.S. PATENT DOCUMENTS

| | | |
|---|---|---|
| 2002/0080198 A1* | 6/2002 | Giraldin .............. G07C 9/00111 |
| | | 715/864 |
| 2008/0242261 A1 | 10/2008 | Shimanuki et al. |
| 2009/0286503 A1* | 11/2009 | Ichinose ........... H04M 1/72536 |
| | | 455/404.1 |
| 2010/0311387 A1 | 12/2010 | Cameron et al. |
| 2010/0315235 A1 | 12/2010 | Adegoke et al. |
| 2011/0111728 A1 | 5/2011 | Ferguson et al. |
| 2012/0258681 A1* | 10/2012 | Hanover ................. H04W 4/02 |
| | | 455/404.2 |
| 2013/0110804 A1 | 5/2013 | Davis et al. |

OTHER PUBLICATIONS

Lone Worker Safety Solutions, "Lone Worker Safety Solutions," www.loneworkermonitoring.com/man-down-solutions.htm, accessed Aug. 20, 2013.
Navizon Inc., "Navizon," www.navizon.com, accessed Aug. 20, 2013.
Ultimate Communication Software Ltd., "Red Panic Button App," www.redpanicbutton.com, accessed Aug. 20, 2013.

* cited by examiner

REMOTELY ACTIVATED MONITORING SERVICE

BACKGROUND

This application relates generally to monitoring services. More specifically, the disclosure provided herein relates to a remotely activated monitoring service.

The prevalence of mobile devices in modern society has increased drastically over the past several years. An overwhelming percentage of people in the United States carry a mobile computing device of some type on a daily basis, which some users carrying multiple mobile computing devices. Mobile device users sometimes carry the devices for emergencies. For example, users often say they carry mobile devices to provide safety in the event of emergencies such as weather emergencies, automotive emergencies (breakdowns, accidents, or the like), health emergencies, criminal activity, or the like, which may be encountered by the users.

While users often carry mobile communication devices for protection and/or for use in these and other emergency situations, most mobile devices can provide, at most, the ability to call emergency personnel in the event of an emergency. With the implementation of the E911 system over the past decade, the dialing of 911 from a mobile communication device typically results in the dialing of an emergency dispatcher, as well as initialization of a location-determination process for locating the mobile communications device.

The accuracy of location determinations in E911 systems can vary, but are mandated as of September, 2012 to be within three hundred meters accuracy within six minutes of the user dialing 911. While the E911 system is helpful, many health and/or personal safety emergencies are over by the time an accurate location of the mobile device can be obtained. As such, E911 systems can help locate users in the event of an emergency, but may not enhance survival rates of the users in the case of violent encounters or health emergencies.

SUMMARY

The present disclosure is directed to a remotely activated monitoring service. A user device can execute one or more application programs including, in some embodiments, a monitor application. The application programs can interact with a remotely executed monitoring service. In some embodiments, the monitoring service is an application or module executed by a server computer that can communicate with the user device via a network. The user device can capture, via execution of the monitor application, event data. The event data can include, for example, state information detected at or in a proximity of the user device, settings or options for the monitoring service, preferences, event definitions, location information associated with the user device or entities associated with the user device, user data, other data, or the like.

The event data also can be generated by the user device via interactions with the monitoring service. For example, in some embodiments the user device can facilitate interactions with the monitoring service via web interface accessible via a web browser or other application program executed at the user device. The event data can be generated at or received by the server computer, and stored in a data storage device with information associating the event data with the user device and/or a user or other entity associated with the user device. In some embodiments, the event data can be stored at a data store that is accessible by the server computer, though this is not necessarily the case.

The server computer can detect an event associated with the user device. In some instances, the server computer can receive data from the user device and determine, based upon the data, that the event has occurred. In some other embodiments, the server computer can periodically determine a location, movement, ambient noise or sound level, and/or other condition associated with the user device and determine, based upon these conditions, that the event has occurred. Upon detecting the event, the server computer can determine if monitoring of the user device is to be initiated. In particular, the server computer can compare the detected event against the event data, which can include event definitions or the like that, if detected, will prompt monitoring of the user device. In some embodiments, the user device can generate an explicit monitoring request for requesting monitoring. As such, the server computer can determine that monitoring is to be initiated based upon analysis of event information and/or based upon receiving an explicit request.

Upon determining that an event or request for monitoring has occurred, the server computer can initiate monitoring of the user device or generate a monitoring alert that, when received by the user device, causes the user device to prompt for approval or denial of the monitoring. By prompting users when particular events are detected, the monitoring service can offer proactive monitoring before a user even realizes that a threat or emergency situation exists. If the user approves of the monitoring and/or if the monitoring is to commence without user input (per user settings or configurations), the server computer can initiate the monitoring.

The server computer can identify monitoring hardware and/or software in a proximity of the user device. As used herein, monitoring hardware may be deemed to be "within a proximity" of the user device if the user device is within a detection range of the monitoring hardware. Because various sorts of monitoring hardware may be far away from the user device (e.g., satellites, drones, or other space- or air-located devices), the "proximity" of monitoring hardware can be determined by detection, not spatial relationships. The server computer can be configured to search for monitoring hardware capable of monitoring the user device until the monitoring hardware is identified or the user device no longer requests the monitoring.

Upon identifying the monitoring hardware, the server computer can issue one or more commands for initiating the monitoring, and the monitoring hardware can transmit monitoring data to the server computer and/or the user device. The monitoring hardware can include, for example, audio, video, or photographic signals or data, presence sensor readings or information, location information, movement information, combinations thereof, or the like. The server computer or other entities (e.g., devices or technicians at a monitoring center) can analyze the monitoring data to determine if any action is to be taken. The actions can include, for example, initiating contact with the user device, initiating contact with emergency personnel, activating lighting, video, sound, or other devices in a vicinity of the user device, combinations thereof, or the like. These and other aspects of the concepts and technologies described herein for using a remotely activated monitoring service will be illustrated and described in additional detail below.

According to one aspect of the concepts and technologies disclosed herein, a method is disclosed. The method can include detecting, at a server computer executing a monitoring service, an event associated with a user device. The method further can include determining, by the server computer, that monitoring of a proximity of the user device is to be initiated based upon the event, and determining, by the server computer, a geographic location of the user device. The method can include identifying, by the server computer, monitoring hardware that is to monitor the proximity of the user device, and issuing, by the server computer, a command to the monitoring hardware to initiate monitoring of the proximity of the user device by the monitoring hardware.

In some embodiments, the method further can include determining, by the server computer, if a prompt is to be generated at the user device. In response to a determination that the prompt is to be generated, the method can further include generating, by the server computer, a monitoring alert, and transmitting, by the server computer, the monitoring alert to the user device. The method also can include obtaining, by the server computer, input indicating that the monitoring is to be initiated. Obtaining the input can include receiving a monitoring request from the user device. The monitoring request can include an explicit request generated by the user device in response to detecting an input to select an option to monitor the user device.

In some embodiments, the method also can include obtaining, by the server computer, monitoring data generated by the monitoring hardware, and analyzing, by the server computer, the monitoring data to determine if an action is to be taken. If the server computer determines that an action is to be taken, the method can include generating, by the server computer, action data indicating an action to be taken, and transmitting, by the server computer, the action data to an entity. Transmitting the action data can include generating a request for emergency personnel at the geographic location with user data that identifies an entity associated with the user device. Monitoring can include monitoring the user device.

In some embodiments, monitoring can include monitoring an entity associated with the user device. Identifying the monitoring hardware can include identifying monitoring hardware within detection range of a monitored location including the geographic location. In some embodiments, identifying the monitoring hardware can include identifying a video device within a viewing range of the monitored location. Detecting the event can include detecting a monitoring request generated by the user device, and the user device can include a smartphone. In some embodiments, detecting the event can include determining a further geographic location of the user device, comparing the further geographic location to location data stored at a data store, and determining, based upon the comparison, that the user device is at a location specified by the location data as a location at which monitoring is to be initiated.

According to another aspect of the concepts and technologies disclosed herein, a system is disclosed. The system can include a processor and a memory. The memory can store computer-executable instructions that, when executed by the processor, cause the processor to perform operations. The operations can include detecting an event associated with a user device, determining that monitoring of a proximity of the user device is to be initiated based upon the event, determining a geographic location of the user device, identifying monitoring hardware to monitor the proximity of the user device, and issuing, by the server computer, a command to the monitoring hardware to initiate monitoring of the proximity of the user device by the monitoring hardware.

In some embodiments, the system further includes a data store that stores event data generated by the monitoring service. The event data can include preferences associated with the user device and the monitoring service, event definitions that define conditions in which monitoring of the proximity of the user device is to be initiated, location data defining locations at which monitoring of the proximity of the user device is to be initiated, and user data including data describing a user associated with the user device.

In some embodiments, the system can be further configured to execute the computer-executable instructions to perform operations further including obtaining monitoring data generated by the monitoring hardware, analyzing the monitoring data to determine if an action is to be taken, and in response to a determination that the action is to be taken, generating action data indicating an action to be taken, and transmitting the action data to an entity. In some embodiments, the user device can include a smart phone that executes an application program that interacts with a monitoring service. In some embodiments, the smart phone executes the application program to perform operations including displaying a prompt for user permission to initiate monitoring, in response to receiving a monitoring alert from a monitoring service, displaying a user interface control for requesting monitoring of the user device, and generating a monitoring request based upon conditions at the user device.

According to yet another aspect, a computer storage medium is disclosed. The computer storage medium can have computer-executable instructions stored thereon that, when executed by a processor, cause the processor to perform operations. The operations can include detecting an event associated with a user device, determining that monitoring of a proximity of the user device is to be initiated based upon the event, determining a geographic location of the user device, identifying monitoring hardware to monitor the proximity of the user device, and issuing a command to the monitoring hardware to initiate monitoring of the proximity of the user device by the monitoring hardware.

In some embodiments, the computer storage medium further includes computer-executable instructions that, when executed by the processor, cause the processor to perform additional operations. The additional operations can include obtaining monitoring data generated by the monitoring hardware, analyzing the monitoring data to determine if an action is to be taken, and in response to a determination that the action is to be taken, generating action data indicating an action to be taken, and transmitting the action data to an entity. In some embodiments, the computer storage medium further includes computer-executable instructions that, when executed by the processor, cause the processor to perform additional operations. The additional operations can include obtaining event data generated by a monitoring service, and storing the event data at a data store. The event data can be stored with data that associates the event data with the user device.

In some embodiments, the computer storage medium includes computer-executable instructions that, when executed by the processor, cause the processor to perform additional operations. The additional operations can include determining that a prompt is to be generated at the user device. In response to a determination that the prompt is to be generated, the processor can generate a monitoring alert, and transmit the monitoring alert to the user device. The processor can obtain input from the user device. The input can indicate that the monitoring is to be initiated.

Other systems, methods, and/or computer program products according to embodiments will be or become apparent

DETAILED DESCRIPTION

Figure 1:
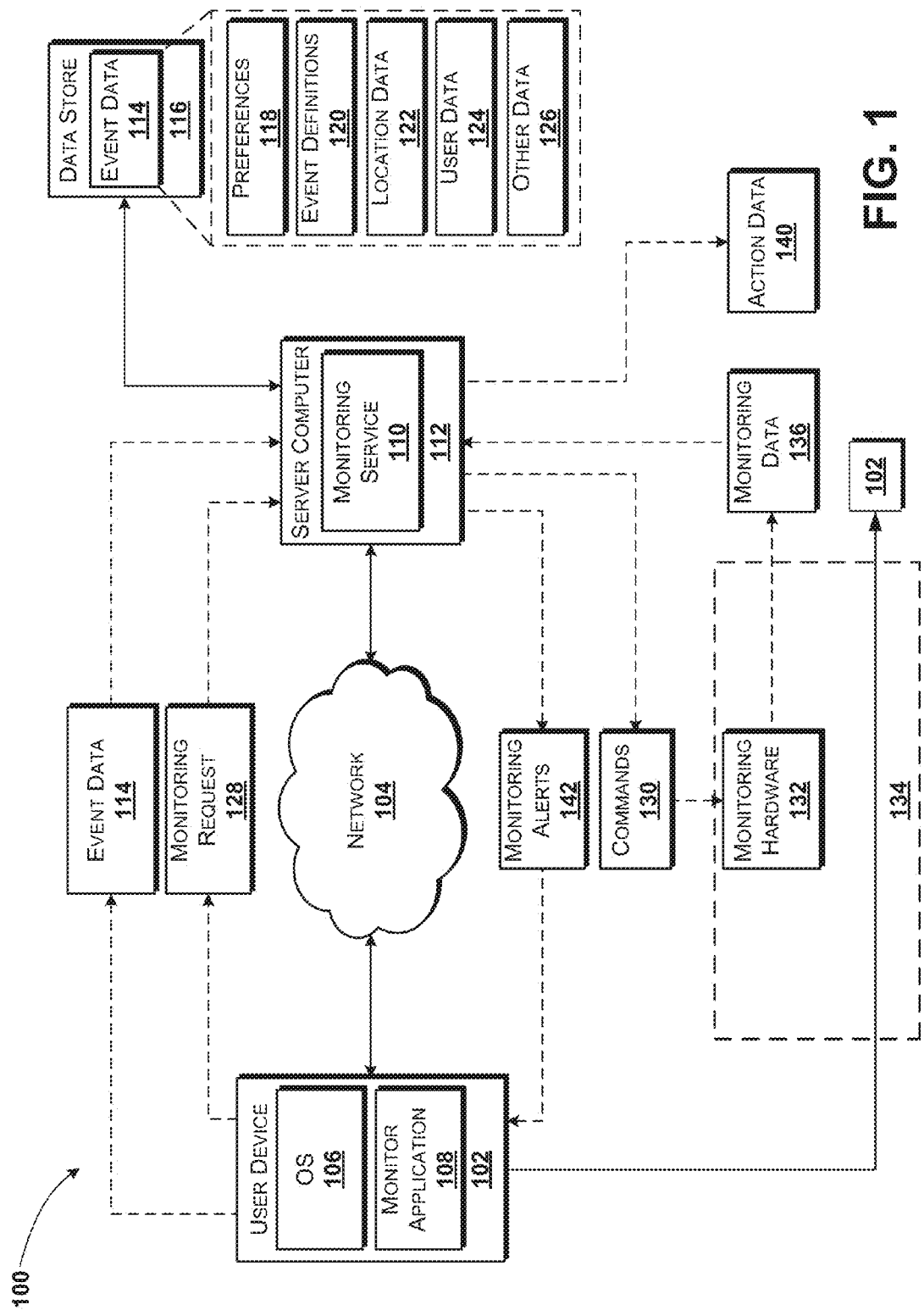
FIG. 1 is a system diagram illustrating an illustrative operating environment for the various embodiments disclosed herein.

The following detailed description is directed to a remotely activated monitoring service. A user device can interact with a monitoring service hosted by a server computer. The user device and/or the server computer can capture event data that can include, for example, state information detected at or in a proximity of the user device, settings or options relating to the monitoring service, preferences, event definitions, location information associated with the user device or entities associated with the user device, user data, other data, or the like. The event data can be generated at or received by the server computer and stored in a data storage device.

The server computer can detect an event associated with the user device. The server computer can determine, based upon the detected event and/or the event data, if monitoring of the user device is to be initiated. Upon determining that an event or request for monitoring has occurred, the server computer can initiate monitoring of the user device or generate a monitoring alert that, when received by the user device, causes the user device to prompt for approval or denial of the monitoring. If monitoring is to be initiated, the server computer can identify monitoring hardware and/or software in a proximity of the user device, and issue one or more commands for initiating the monitoring.

The monitoring hardware can transmit monitoring data to the server computer and/or the user device. The monitoring hardware can include, for example, digital or analog audio or video signals, photographic information, presence or orientation sensor readings or information, network communication information, location information, movement information, combinations thereof, or the like. The monitoring data can be analyzed to determine if any action is to be taken. If actions are to be taken, the server computer or other entities can generate action data for commencing the action. The actions can include, for example, initiating contact with the user device, initiating contact with emergency personnel, activating lighting, video, sound, or other devices in a vicinity of the user device, combinations thereof, or the like. These and other aspects of the concepts and technologies described herein for using a remotely activated monitoring service will be illustrated and described in additional detail below.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and interacting with a remotely activated monitoring service will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more smartphones, feature phones, personal digital assistants ("PDAs"), laptop computers, tablet computers, other mobile computing devices, a vehicle computing system, a smart watch, a mobile media device, a personal tracker or safety device, other computing systems, combinations thereof, or the like. It should be understood that the functionality of the user device 102 can be provided by a single device, by two similar devices, and/or by two or more dissimilar devices. For purposes of describing the concepts and technologies disclosed herein, the user device 102 is described herein as a smartphone or other form of mobile computing device. It should be understood that this embodiment is illustrative, and should not be construed as being limiting in any way.

The user device 102 can execute an operating system 106, one or more application programs (not shown), and a monitor application 108. The operating system 106 is a computer program for controlling the operation of the user device 102. The application programs and the monitor application 108 can include executable programs configured to execute on top of the operating system 106 to provide various functions. In some embodiments, the application programs can include, but are not limited to, web browsers, web applications, native applications, password management applications, electronic transaction management applications, combinations thereof, or the like. Because various forms of application programs are generally understood, the application programs are not described in additional detail herein.

In particular, the monitor application 108 can be configured to communicate with a monitoring service 110 that is hosted and/or executed by a computing system such as the server computer 112. The functionality of the server computer 112 can be provided by one or more real or virtual computing resources. As such, it should be understood that the monitoring service 110 can provide services to one or more users. For example, the monitoring service 110 can be called as a virtual service by a various users or devices, in some embodiments. In some embodiments, for example, various devices such as the user device 102 can call the monitoring service 110 to create monitoring rules or preferences, to activate or deactivate the monitoring service 110, to request or create routes using the monitoring service 110, combinations thereof, or the like.

In the illustrated embodiment, the monitor application 108 executed by the user device 102 can be configured to submit event data 114 associated with the user device 102 to the monitoring service 110. It should be understood that the user device 102 can interact with the monitoring service 110 via an application program such as, for example, a web browser instead of, or in addition to, the monitor application 108 to generate the event data 114 at the monitoring service 110, if desired. As such, the illustrated embodiments should be understood as being illustrative and should not be construed as being limiting in any way.

As used herein, the term "event data" and variants thereof can include, but is not necessarily limited to, data defining how and when the monitoring service 110 is to be activated. The monitoring service 110 can be configured to store the event data 114 at a real or virtual data storage location such as, for example, a memory, a server computer, a database, a data store, or the like. In the illustrated embodiment of FIG. 1, the monitoring service 110 can be configured to store the event data 114 at a data store 116. The functionality of the data store 116 can be provided by one or more server computers, databases, laptop computers, flash memory devices, hard drives, virtual storage resources, combinations thereof, or the like. The monitoring service 110 can be configured to generate and/or store the event data 114. The monitoring service 110 also can be configured to access the event data 114 to provide the functionality described herein for providing a remotely activated monitoring service.

As will be explained in more detail below, the monitoring service can access the event data 114 to determine if monitoring of a user device 102 and/or a user associated with the user device 102 is to be initiated, to determine if monitoring of the user device 102 and/or the user is to be ended, to determine if instructions for initiating and/or terminating the monitoring are to be generated and/or propagated to monitoring devices or systems, to determine if actions are to be taken in response to the monitoring, combinations thereof, or the like. Because the functionality described herein for providing a remotely activated monitoring service can be provided in a variety of ways and/or can entail additional and/or alternative determinations, it should be understood that these examples are illustrative and therefore should not be construed as being limiting in any way.

In the illustrated embodiment, the event data 114 can include, but is not necessarily limited to, preferences 118, event definitions 120, location data 122, user data 124, other data 126, combinations thereof, or the like. Some examples of each of these types of data are described below. Because the event data 114 can include these and other types of data and/or can omit the above types of data, it should be understood that these examples are illustrative and therefore should not be construed as being limiting in any way.

The preferences 118 can include, for example, user and/or software settings, options, parameters, and/or other configuration information associated with the monitor application 108 and/or the monitoring service 110. Various examples of the preferences 118 will be illustrated and described in additional detail herein, particularly with reference to FIG. 4A below. Briefly, the preferences 118 can define, for example, if the monitor application 108 and/or the monitoring service 110 are to be initiated by events detected at the monitor application 108 and/or the monitoring service 110, if the monitor application 108 and/or the monitoring service 110 are to generate monitoring alerts, how data communications between the user device 102 and the monitor application 108 and/or the monitoring service 110 are to be conducted, whether or not the monitor application 108 and/or the monitoring service 110 are to support location-based events and/or services, if video, audio, and/or other types of monitoring are to be used and/or allowed by the monitor application 108 and/or the monitoring service 110, if data generated by monitoring devices, systems, or other hardware is to be shared with the monitor application 108 and/or the monitoring service 110, if a user can explicitly request monitoring, if functionality for generating navigation routes using the monitor application 108 and/or the monitoring service 110 is to be supported, other options, combinations thereof, or the like.

The preferences 118 also can include user information such as names, login information, passwords, and/or identifying information such as physical characteristics, address information, age information, combinations thereof, or the like (some of this data may be included in the user data 124 described below). This information can be used by responders, for example police, fire, and/or medical responders in the event of an emergency, to identify the user. The preferences 118 also can include billing preferences, billing plans, device information, combinations thereof, or the like. Because the preferences 118 can include additional and/or alternative user and/or device information, it should be understood that these examples are illustrative and therefore should not be construed as being limiting in any way.

The event definitions 120 can include, for example, data that defines events to be used to initiate and/or terminate monitoring provided by the remotely activated monitoring service. Thus, the event definitions 120 can include, for example, data defining geographic locations at which monitoring is to be initiated or terminated, data defining times or dates at which monitoring is to be initiated or terminated, location demographics and/or other considerations that, if met by a current location of the user device 102 and/or a user associated with the user device 102, are to initiate and/or terminate monitoring, or the like. The event definitions 120 also can include data that defines other situations or circumstances in which monitoring is to be initiated and/or terminated.

The other situations or circumstances can include, for example, a number of users or devices in a proximity of the user device 102, a geographic location of the user device 102, a particular frequency and/or volume of audio signals at or near the user device 102 (e.g., a siren, a burglar alarm, a gunshot, a scream, or the like), particular movements of the user device 102 (e.g., movement associated with running or falling), or the like. Because the situations or circumstances can include almost any defined situations or circumstances that can be detected by hardware and/or software associated with the user device (see FIG. 7 below), it should be understood that these examples are illustrative and therefore should not be construed as being limiting in any way.

The location data 122 can indicate or represent one or more geographic locations associated with the user device 102. The location data 122 can be captured by the user device 102 using various location-determination technologies. For example, the user device 102 can include one or more global positioning system ("GPS") receivers via which the user device 102 can determine a location of the user device 102. Additionally or alternatively, the user device 102 can use one or more assisted GPS ("A-GPS") technologies to determine location such as, for example, scanning a proximity associated with the user device 102 to determine one or more wireless network equipment identities, location beacons, or the like in communication with the user device 102. Additionally, or alternatively, the user device 102 can execute one or more location determination applications configured to determine a location of the user device 102 by monitoring movements of the user device using various sensors such as, for example, magnetometers, accelerometers, gyroscopes, or the like.

The user device 102 also can rely upon triangulation techniques to determine a location associated with the user device 102. For example, the user device 102 can communicate with three or more cellular towers or other wireless transmitters and/or transceivers to determine a location of the user device 102 using triangulation. Additionally, or alternatively, the user device 102 can obtain location data 122 from a cellular network and/or other networks or devices. Because various technologies and/or combinations thereof can be used to determine the location data 122, it should be understood that these examples are illustrative and therefore should not be construed as being limiting in any way.

The user data 124 can include, for example, data that identifies and/or defines the user and/or users of the user device 102. The user data 124 can include, but is not limited to, user information such as names, physical characteristics, address information, age information, combinations thereof, or the like. The user data 124 can include, for example, data defining a height, weight, hair color, eye color, complexion, age, address, nickname, or the like associated with the user. The user data 124 also can include data defining, for example, medications used by the user, allergies of the user, languages spoken by the user, and/or other information that may assist anyone responding to an emergency associated with the user and/or the user device 102.

The user data 124 also can include biometric information such as, for example, voiceprint information, fingerprint information, blood type information, known illnesses or conditions associated with the user, combinations thereof, or the like. Because the user data 124 can include additional or alternative information that identifies the user and/or other information about the user, it should be understood that the above examples are illustrative and therefore should not be construed as being limiting in any way.

The other data 126 can include, but is not limited to, social networking information associated with a user of the user device 102, identification information associated with the user and/or other entities or devices in a proximity associated with the user device 102, preferences associated with the monitor application 108 and/or the monitoring service 110, combinations thereof, or the like. The other data 126 also can include billing and/or charging preferences or information. Because other types of information can be used to provide the functionality described herein, it should be understood that these examples are illustrative and therefore should not be construed as being limiting in any way.

As noted above, the event data 114 can be stored at the data store 116 and can be used by the monitor application 108 and/or the monitoring service 110 to provide the functionality described herein. Thus, though not described herein, it should be understood that the event data 114 can be associated with a particular user and/or user device 102. As such, the monitor application 108 and/or the monitoring service 110 can access the event data 114 to identify preferences 118, event definitions 120, location data 122, user data 124, and/or other data 126 associated with a particular user and/or user device 102 to provide the functionality described herein.

As will be explained in more detail below, the monitoring service 110 can analyze the event data 114 stored at the data store 116 (or elsewhere) in conjunction with locations and/or events associated with the user device 102 and/or a user thereof to determine if monitoring of the user device 102 is to be initiated or terminated. Additionally, or alternatively, the monitoring service 110 can receive an explicit request to initiate or terminate monitoring of the user device 102 and/or a user thereof. In the embodiment shown in FIG. 1, the monitoring service 110 can receive a monitoring request 128, which can include an explicit request for monitoring from the user device 102. As will be illustrated and described in more detail below, the monitoring request 128 can correspond to a panic button, or the like, being selected at the user device 102. As noted above, the monitoring request 128 also can be implicitly generated by an event detected at the user device 102. As such, the illustrated embodiment should be understood as being illustrative, and should not be construed as being limiting in any way.

Upon receiving a monitoring request 128 at the monitoring service 110, or upon determining at the monitoring service 110 that monitoring of the user device 102 and/or a user thereof is to be initiated, the monitoring service 110 can initiate monitoring of the user device 102 and/or a user thereof. In particular, the monitoring service 110 can generate one or more instructions or commands ("commands") 130 that, when received by monitoring devices, hardware, and/or systems ("monitoring hardware") 132, cause the monitoring hardware 132 to monitor the user device 102 and/or a user thereof. It should be understood that the monitoring hardware 132 can be associated with a particular area, region, space, building, or other location ("monitored location") 134 that is within range of one or more audio, visual, network, and/or presence sensors associated with the monitoring hardware 132. As such, the monitoring service 110 can be configured to determine a location of a user device 102 and/or a user thereof, to identify a monitored location 134 and/or monitoring hardware at or near the user device 102 and/or the user thereof, and to generate the commands 130. As noted above, the commands 130 can be issued to initiate monitoring by the monitoring hardware 132 of the monitored location 134, the user device 102, and/or a user or other entity associated with the user device 102 that is within or near the monitored location 134.

According to various embodiments, the monitoring hardware 132 can include, but is not limited to, various monitoring devices, hardware, systems, networks, or the like. By way of example, and not limitation, the monitoring hardware 132 can include various devices associated with the monitored location 134 such as video devices such as cameras, closed circuit television ("CCTV") devices, and/or other video devices such as infrared cameras, or the like; audio sensors such as microphones, break sensors, or the like;

photography devices such as cameras, infrared imaging devices, or the like; presence sensors such as pressure sensors, radio frequency identification ("RFID") tag sensors or readers, near field communication ("NFC") devices, short- or long-range radio receivers, transmitters, or transceivers, or the like; and/or other devices.

The monitoring hardware 132 also can include hardware and/or software that is located remote from the monitored location 134. Thus, for example, the monitoring hardware 132 can include aircraft equipped with surveillance equipment such as aircraft, helicopters, drones, or the like. The monitoring hardware 132 also can include satellites and/or satellite imaging hardware or software, network devices, location sensors, or the like, for identifying the user device 102 and/or a user. Because the monitoring hardware 132 can include additional and/or alternative hardware and/or software, it should be understood that these examples are illustrative and therefore should not be construed as being limiting in any way.

The monitoring hardware 132 and/or components thereof can be connected via one or more wired and/or wireless connections to the monitoring service 110 and/or the monitor application 108. The monitoring hardware 132 can generate monitoring data 136 and transmit or otherwise share the monitoring data 136 with the monitor application 108 and/or the monitoring service 110. It can be appreciated from the above description of the monitoring hardware 132, that the monitoring data 136 can include data or other information generated or sensed by the monitoring hardware 132. Thus, the monitoring data 136 can include, for example, digital and/or analog video signals; digital and/or analog audio signals; photograph and/or other image data; streaming video, audio, or image data; presence sensor readings; location information; network logs and/or device data; user identification information; network identifiers and/or device identifiers; other information; combinations thereof; or the like. These and other types of data can be included in the monitoring data 136 and used by the monitor application 108 and/or the monitoring service 110 for various purposes.

In particular, the monitoring service 110 and/or other entities, software, and/or devices with access to the monitoring data 136 can monitor the user device 102 and/or a user associated therewith by viewing and/or analyzing the monitoring data 136. Thus, for example, a technician or hardware/software appliance reviewing the monitoring data 136 can determine if an action is to be taken based upon the monitoring data 136. For example, if the monitoring data 136 includes an analog or digital video signal or data, the technician or appliance may determine, based upon the video, that emergency assistance is needed at the user device 102 and/or by a user associated with the user device 102. As such, the technician or appliance can generate action data 140 that can be shared with various entities (not shown) such as emergency personnel, emergency dispatchers, contacts, or the like, to prompt a response.

In some embodiments, the action data 140 can correspond to voice or data communications. As such, it should be understood that the monitoring service 110 and/or other entities can call or message responders or the like to prompt a response such as an emergency response. As such, the monitoring data 136 can be used to monitor a user device 102 and/or a user thereof (or associated therewith) to provide a mobile monitoring, alarm, and/or response system. These and other features of the concepts and technologies described herein will be illustrated and described in additional detail below.

The monitoring service 110 also can be configured to generate monitoring alerts 142. The monitoring alerts 142 can be generated by the monitoring service 110 to generate a prompt at a user device 102. The prompt can be generated to inform a user or other entity associated with the user device 102 that the monitoring service 110 has detected an event defined by the user or other entity as an event that is to prompt monitoring (or a decision whether or not to monitor). Thus, for example, the monitoring service 110 can detect that the user device 102 and/or a user thereof has entered a location that is to be monitored and/or that one or more events defined by the user or other entity for initiating or terminating monitoring have been satisfied or met.

The user device 102 can execute the monitor application 108 to present a screen display for prompting the user or other entity regarding the monitoring alert 142. An example of a screen display for prompting a user or other entity regarding the monitoring alert 142 is illustrated and described below with reference to FIG. 4B. Briefly, the user or other entity can be informed regarding the event(s) that have been detected, and prompted as to whether or not monitoring is to be initiated. If the user elects to initiate monitoring, the user device 102 can transmit a monitoring request 128 to the monitoring service 110, and the monitoring service 110 can generate the commands 130 described hereinabove. If the user elects not to initiate monitoring, the user device 102 can ignore the monitoring alert 142. The functionality of the monitor application 108 and/or the monitoring service 110 for providing and/or responding to the monitoring alerts 142 are illustrated and described in more detail below with reference to FIGS. 2-4D.

FIG. 1 illustrates one user device 102, one network 104, one server computer 110, one data store 116, one instance of monitoring hardware 132, and one monitored location 134. It should be understood, however, that various implementations of the operating environment 100 include zero, one, or more than one user device 102, zero, one, or more than one network 104, zero, one, or more than one server computer 110, zero, one, or more than one data stores 116, zero, one, or more than one instance of monitoring hardware 132, and/or zero, one, or more than one monitored locations 134. As such, the illustrated embodiment should be understood as being illustrative, and should not be construed as being limiting in any way.

Figure 2:
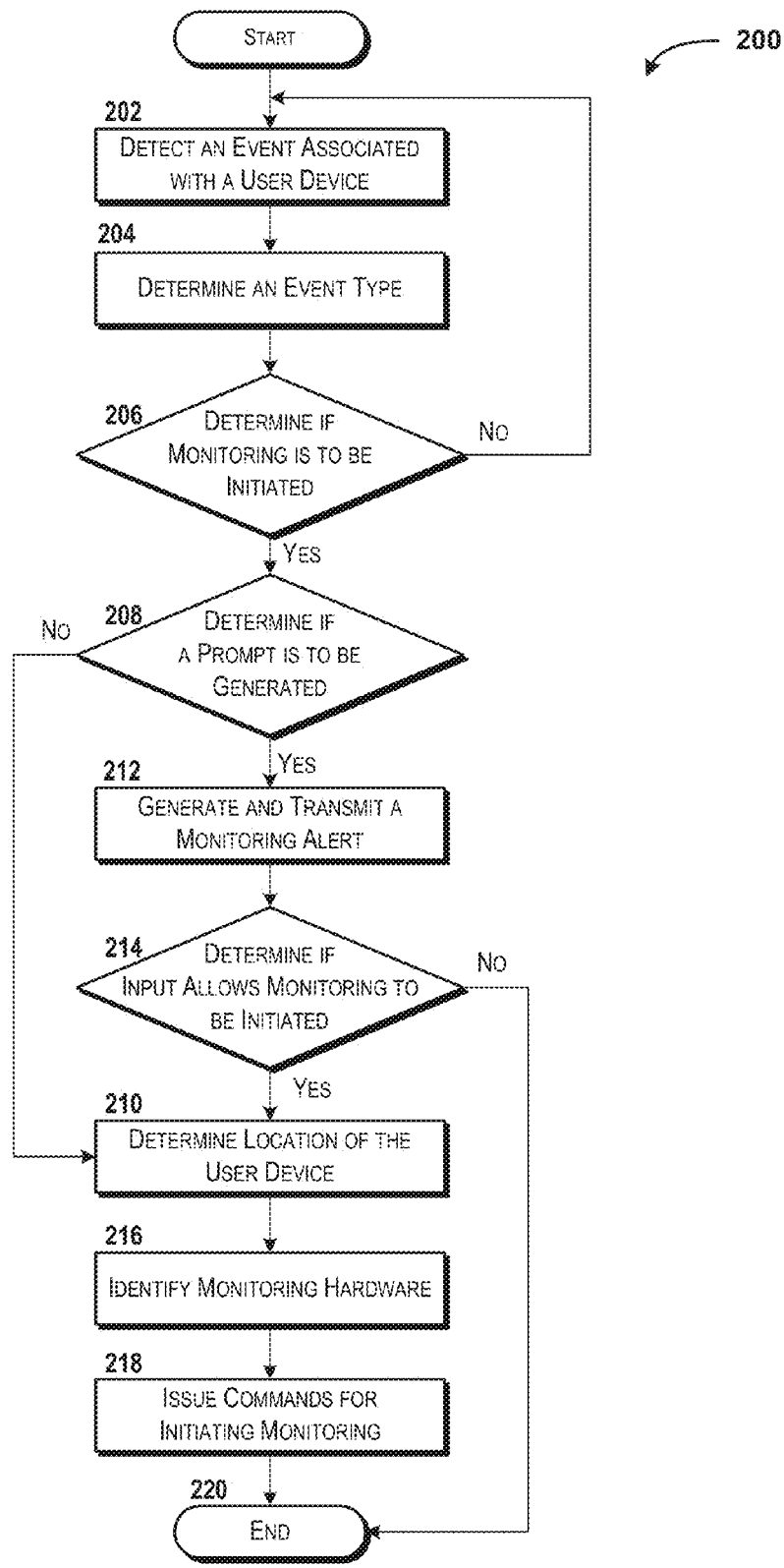
FIG. 2 is a flow diagram showing aspects of a method for remotely activating a remotely activated monitoring service, according to an illustrative embodiment.

Turning now to FIG. 2, aspects of a method 200 for remotely activating a remotely activated monitoring service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the user device 102 or the server computer 112 to perform one or more operations and/or causing the processor to direct other components of the computing system or device to perform one or more of the operations.

For purposes of illustrating and describing the concepts of the present disclosure, the methods disclosed herein are described as being performed by the server computer 112 via execution of one or more software modules such as, for example, the monitoring service 110. It should be understood that additional and/or alternative devices and/or network nodes can provide the functionality described herein via execution of one or more modules, applications, and/or other software including, but not limited to, the monitoring service 110. Thus, the illustrated embodiments are illustrative, and should not be viewed as being limiting in any way.

The method 200 begins at operation 202. In operation 202, the server computer 112 detects an event associated with a device such as, for example, the user device 102. According to various embodiments, the event detected by the server computer 112 can include an event occurring at the user device 102, an event occurring in proximity of and/or associated with the user device 102, an event involving a user of the user device 102 (but not necessarily occurring at the user device 102), movement of the user device 102, a location of the user device, combinations thereof, or the like.

As such, the event detected in operation 202 can include, for example, movement of the user device 102 into or near a particular location; a sound detected at or near the user device 102; communications between the user device 102 and one or more devices, systems, networks, or the like; selection of a panic button or other UI control for requesting monitoring; receipt or generation of an explicit or implicit monitoring request 128; other events; combinations thereof; or the like. The events are not limited to these examples, and as such it should be understood that these examples are illustrative and should not be construed as being limiting in any way.

From operation 202, the method 200 can proceed to operation 204. In operation 204, the server computer 112 determines an event type associated with the event detected in operation 202. Thus, the user device 102 can be configured to determine, for example, if the event detected in operation 202 corresponds to a defined event for initiating monitoring of the user device 102 and/or a user thereof, and/or if the event corresponds to an implicit or explicit request for monitoring. It can be appreciated that if the event detected in operation 202 corresponds to an implicitly generated monitoring request 128, the monitoring service 110 may generate a monitoring alert 142 to trigger prompting of the user regarding monitoring. If the event detected in operation 202 corresponds to an explicitly generated monitoring request 128, the monitoring service 110 may determine that a monitoring alert 142 is not to be triggered, and that the monitoring is to be initiated immediately.

From operation 204, the method 200 can proceed to operation 206. In operation 206, the server computer 112 can determine if monitoring is to be initiated based upon the event detected in operation 202 and/or the event type determined in operation 204. If the server computer 112 determines, in operation 206, that the monitoring is not to be initiated, the method 200 can return to operation 202, monitoring may not be initiated, and the monitoring service 110 can again monitor the device until an event is detected in a future iteration of operation 202. It should be understood that the method 200 also can end if the server computer 112 determines, in operation 206, that the monitoring is not be initiated, though this is not shown in FIG. 2.

If the server computer 112 determines, in operation 206, that the monitoring is to be initiated, the method 200 can proceed to operation 208. According to various embodiments, the server computer 112 can be configured to examine one or more settings or preferences associated with the monitoring service 110 and/or the monitor application 108 to determine if monitoring is to be initiated in operation 204. According to some other embodiments, the server computer 112 can be configured to compare one or more events detected in association with the user device 102 to the preferences or settings such as the preferences 118 and other event data 114 such as the event definitions 120, the location data 122, the user data 124, and/or the other data 126 to determine if an event detected by the monitoring service 110 and/or the monitor application 108 satisfies conditions to begin monitoring of the user device 102 and/or an entity associated with the user device 102.

As such, operation 206 can correspond to the server computer 112 examining the event data 114 and conditions at the user device 102 and/or proximate to the user device 102 to determine if monitoring is to be initiated. Because the server computer 112 can be configured to determine that monitoring is to be initiated in additional and/or alternative ways, it should be understood that the above-described example of operation 206 is illustrative and should not be construed as being limiting in any way.

In some embodiments, the server computer 112 can be configured to determine if the event detected in operation 202 is similar to or matches any of the event definitions 120 included in the event data 114. If the server computer 112 determines that the event data 120 does not include a definition that is similar to or matches the event detected in operation 202, the server computer 112 can determine that monitoring is not to be initiated. In some embodiments, the event detected in operation 202 can correspond to an explicit request for monitoring such as, for example, selection of a panic button or other explicit monitoring request 128. As such, the server computer 112 can be configured, in some embodiments, to determine that monitoring is to be initiated based upon the identification of the event detected in operation 202 as corresponding to an explicit monitoring request 128. As noted above, the method 200 can flow to operation 208 if the server computer 112 determines, in operation 206, that monitoring is to be initiated based upon analysis of the event detected in operation 202.

In operation 208, the server computer 112 can determine if a prompt is to be generated. The prompt can ask a user or other entity if monitoring of the user device 102 and/or an entity associated with the user device 102 is to be initiated. It can be appreciated that the determination in operation 208 can correspond to the server computer 112 determining if a monitoring alert 142 is to be generated by the server computer 112. As such, it can be appreciated that the server computer 112 can determine, in operation 208, if a preference, configuration, setting, or other consideration specifies that the user or user device 102 is to be prompted prior to beginning monitoring.

In some embodiments, a user or other entity may specify that a monitoring alert 142 is to be generated and/or that a prompt indicating that monitoring is to be initiated prior to initiating monitoring. Thus, perceived security and/or privacy concerns can be satisfied prior to initiating monitoring, in some embodiments. In some other embodiments, a user or other entity may specify that a monitoring alert 142 is not to be generated in some or all situations. As such, the server computer 112 can determine, in operation 208, if a prompt is to be generated based upon these and/or other considerations.

If the server computer 112 determines, in operation 208, that a prompt is not be generated, the method 200 can proceed to operation 210. If the server computer 112 determines, in operation 208, that a prompt is be generated, the method 200 can proceed to operation 212.

In operation 212, the server computer 112 can generate a monitoring alert 142 and transmit the monitoring alert 142 to the user device 102. As explained above, the monitoring alert 142 can be used to trigger a prompt at the user device 102 and/or to otherwise obtain input for specifying if monitoring is to be initiated. An example of a screen display for presenting the prompt at a device such as the user device 102 is illustrated and described in FIG. 4B below.

From operation 212, the method 200 proceeds to operation 214. In operation 214, the server computer 112 can determine if input associated with the user device 102 indicates that monitoring is to be initiated. It can be appreciated that the determination in operation 214 can correspond to the server computer 112 determining if the prompt generated and transmitted in operation 212 has been affirmatively responded to at the user device 102 or not.

If the server computer 112 determines, in operation 214, that the monitoring is not be initiated, the method 200 can end. It should be understood that the method 200 can alternatively return to operation 202 if the server computer 112 determines, in operation 214, that the monitoring is not be initiated, though this is not shown in FIG. 2. If the server computer 112 determines, in operation 214, that the monitoring is to be initiated based upon the user input, the method 200 can proceed to operation 210.

In operation 210, the server computer 112 can determine a location of the user device 102. In some embodiments, the server computer 112 can query a location server or other location-based services device for a location associated with the user device 102 to determine the location in operation 210. In some embodiments, for example where the user device 102 generates an explicit monitoring request 128, the server computer 112 can receive the location with the monitoring request 128 and/or may determine the location based upon known or accessible information. In some embodiments, the monitoring service 110 executed by the server computer 112 can communication with the user device 102 and/or the monitor application 108 executed by the user device 102 to request, receive, and/or otherwise obtain the location. Regardless of how the location information is obtained, it can be appreciated that the server computer 112 can determine a geographic location of the user device 102 in operation 210.

From operation 210, the method 200 can proceed to operation 216. In operation 216, the server computer 112 can identify one or more monitoring systems, devices, or networks in the proximity of the user device 102 and/or an entity associated with the user device 102. Thus, for example, the server computer 112 can identify, in operation 210, one or more instances of monitoring hardware 132 at or near the user device 102, at or near the monitored location 134, and/or within a detection range of the user device 102, the monitored location 134, and/or an entity associated with the user device 102.

In some embodiments, the server computer 112 can maintain or access a database or other data structure that lists or represents monitoring hardware 132 that can interact with the monitoring service 110 and/or the user device 102 to monitor the user device 102 and/or an entity associated with the user device 102. Because the server computer 112 can identify the monitoring hardware 132 in a proximity of the user device 102 in additional or alternative ways, it should be understood that this example is illustrative and therefore should not be construed as being limiting in any way. As used herein, monitoring hardware 132 can be in a "proximity" of the user device 102 if the user device 102 is within a detection range of the monitoring hardware 132. It can be appreciated from the above description of the monitoring hardware 132 that the distance between the monitoring hardware 132 and the user device 102 can be substantial.

If there is no monitoring hardware 132 at or near the user device 102, the server computer 112 can be configured to identify the monitoring hardware 132 that is as close as possible (in ability to detect and/or monitor the user device 102). Thus, if no monitoring hardware 132 is available, the server computer 112 can continue searching and/or issue commands 130 until monitoring hardware 132 is available to monitor the user device 102. It should be understood that this example is illustrative and therefore should not be construed as being limiting in any way.

From operation 216, the method 200 can proceed to operation 218. In operation 218, the server computer 112 can generate and issue commands 130 for initiating the monitoring. As noted above, the server computer 112 can issue commands 130 to the monitoring hardware 132 and/or can attempt to issue multiple commands 130 to multiple instances of monitoring hardware 132. The commands 130 can request monitoring of the user device 102 or a user associated with the user device 102. Although not illustrated in FIG. 2, it should be understood that the server computer 112 can obtain confirmation that the monitoring has been initiated, and may issue more than one command 130 if the confirmation is not received or until the confirmation is received.

From operation 218, the method 200 can proceed to operation 220. The method 200 ends at operation 220.

Figure 3:
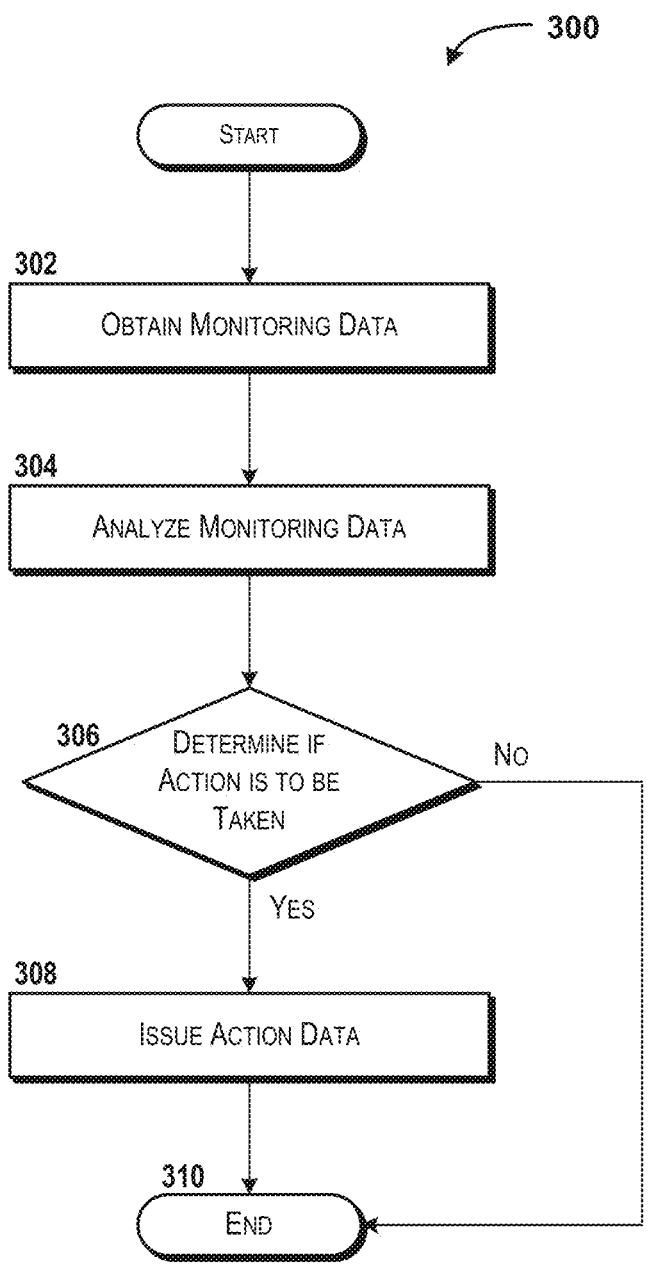
FIG. 3 is a flow diagram showing aspects of a method for using a remotely activated monitoring service, according to another illustrative embodiment.

Turning now to FIG. 3, aspects of a method 300 for using a remotely activated monitoring service will be described in detail, according to an illustrative embodiment. While the method 300 is described as being performed by the server computer 112, it should be understood that additional or alternative entities can execute the operations shown in FIG. 3. As such, the illustrated embodiment is illustrative and should not be construed as being limiting in any way.

The method 300 begins at operation 302. In operation 302, the server computer 112 obtains monitoring data 136.

As explained above with reference to FIG. 1, the monitoring data 136 can be shared with the server computer 112 and/or other entities by the monitoring hardware 132. Thus, operation 302 can correspond to the server computer 112 receiving the monitoring data 136 from the monitoring hardware 132. It should be understood that this example is illustrative and therefore should not be construed as being limiting in any way.

From operation 302, the method 300 can proceed to operation 304. In operation 304, the server computer 112 analyzes the monitoring data 136. The analysis of the monitoring data 136 can include various types of analysis. For example, the server computer 112 and/or other devices or systems can analyze the monitoring data 136 to identify suspect movements. For example, the server computer 112 or other entities can execute algorithms that search detected movements for recognized patterns that indicate suspect or even criminal activity.

Additionally, or alternatively, analyzing the monitoring data 136 can include using facial recognition, body shape, clothing, and/or materials recognition techniques to track particular users and/or movements of the users to provide monitoring as disclosed herein. Thus, the monitoring data 136 can include video signals (analog or digital), and the monitoring can include tracking users and/or movements of the users within the video to provide the monitoring. In some embodiments, wherein video signals or data include multiple users, the server computer 112 can be configured to generate a screen display for that overlays identity information on the video.

In particular, the video data or signals can be analyzed by the server computer 112, and identities of one or more people in the video can be determined. It should be understood that identities of some people in the video may not be determined if those users have not opted into the monitoring service 110. At any rate, the monitoring service 110 can be configured to generate an overlay for the video, wherein the overlay can superimpose a bubble or other tag for labeling the users in the video. An example of an overlay is shown in FIG. 4E below. It should be understood that this example is illustrative and therefore should not be construed as being limiting in any way.

In some embodiments, the monitoring data 136 can include audio signals, in which case the server computer 112 can analyze the audio for audio that matches defined patterns such as, for example, sirens, gunshots, screams, or the like. Still further, the monitoring data 136 can include accelerometer, gyroscope, magnetometer, and/or other orientation or movement sensors associated with the user device 102 and/or the monitoring hardware 132.

As such, the monitoring data 136 can be analyzed to detect running or other movements that indicate suspicious activity. In still other embodiments, the monitoring data 136 can correspond to analog or digital video signals, and a user or other entity can monitor the video to detect suspicious activity. Because the server computer 112 or other entity can analyze the monitoring data 136 in a number of ways, it should be understood that these examples are illustrative and therefore should not be construed as being limiting in any way.

From operation 304, the method 300 can proceed to operation 306. In operation 306, the server computer 112 can determine if any action is to be taken based upon analysis of the monitoring data 136. If the server computer 112 determines, in operation 306, that no action is to be taken, the method 300 can end. It should be understood that the method 300 also can return to operation 302 if the server computer 112 determines, in operation 306, that the monitoring data 136 does not indicate any action to be taken or indicates that no action is to be taken, though this is not shown in FIG. 3. If the server computer 112 determines, in operation 306, that action is to be taken, the method 300 can proceed to operation 308.

In operation 308, the server computer 112 can issue action data 140 that defines an action to be taken in response to the analysis of the monitoring data 136. As explained above, the action data 140 issued in operation 308 can correspond to various forms of communications and/or commands. For example, the action data 140 can include voice or data communications, commands for initiating monitoring at other locations at or near the monitoring hardware 132 that issued the monitoring data 136, requests for emergency assistance at a location associated with the user device 102, activation of sirens, lighting, and/or other devices, combinations thereof, or the like. As such, the monitoring data 136 can be analyzed to monitor a user device 102 and/or an entity associated with the user device 102 to provide a mobile monitoring, alarm, and/or response system. It should be appreciated that the server computer 112 can be configured to activate various types of hardware. In some embodiments, the server computer 112 is associated with a communications network operator and as such, the server computer 112 can issue commands, as the action data 140, for activating lighting, telephone, sound, and/or other devices across the network 104. It should be understood that these examples are illustrative and therefore should not be construed as being limiting in any way.

From operation 308, the method 300 can proceed to operation 310. The method 300 ends at operation 310.

Figure 4A:
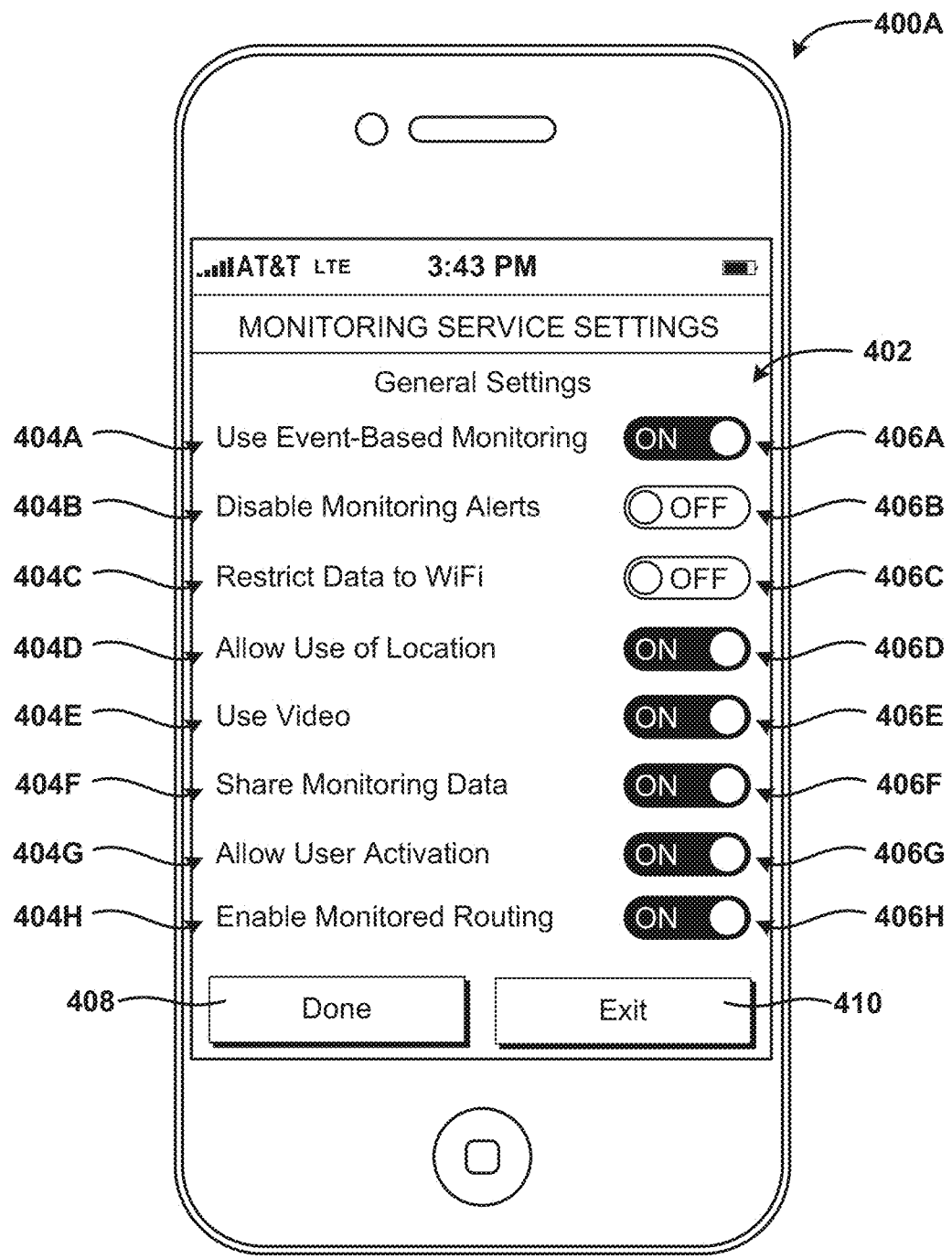
FIGS. 4A-4D are user interface diagrams illustrating user interfaces for configuring and using a remotely activated monitoring service, according to some illustrative embodiments.
Figure 4B:
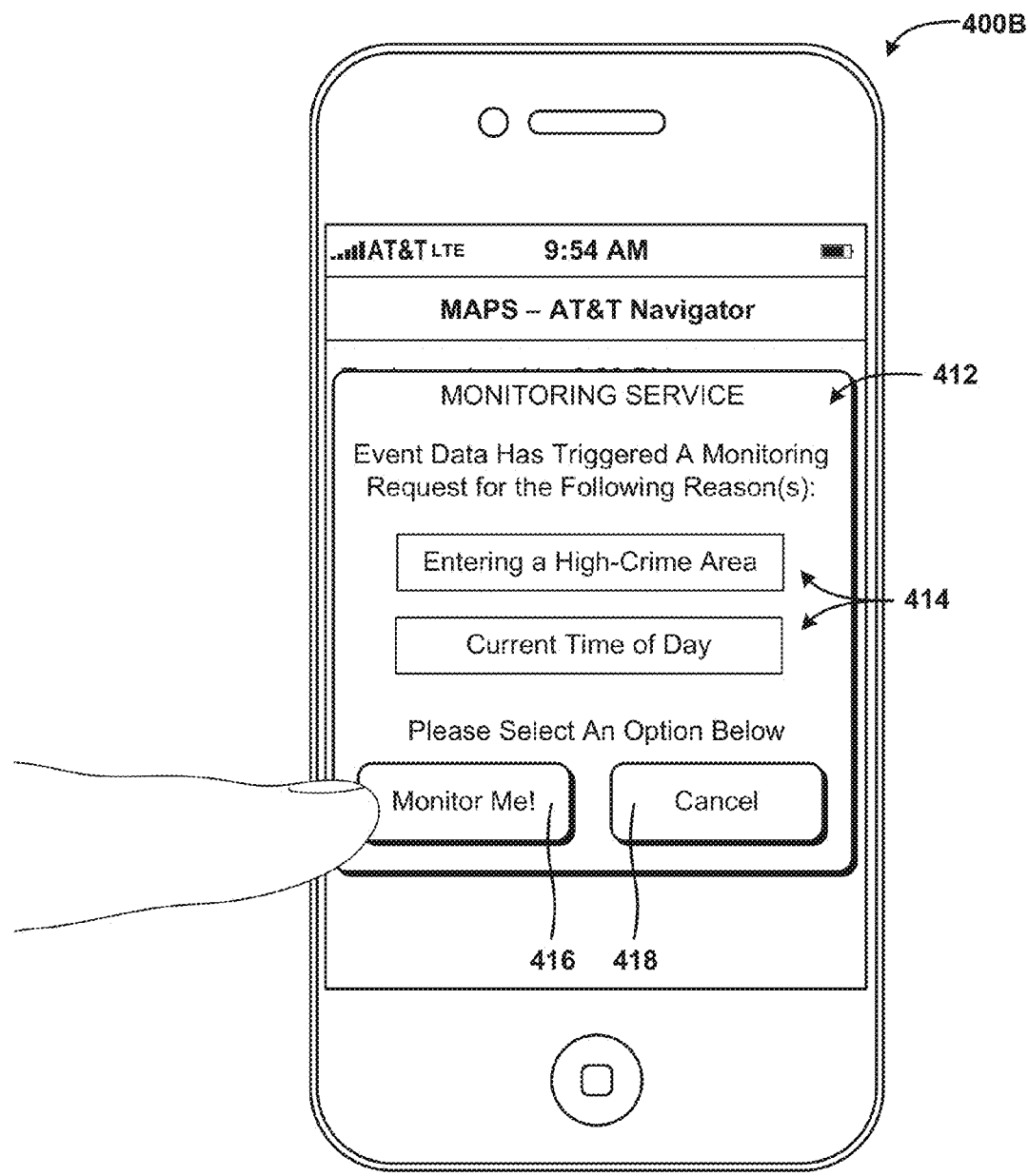
Figure 4C:
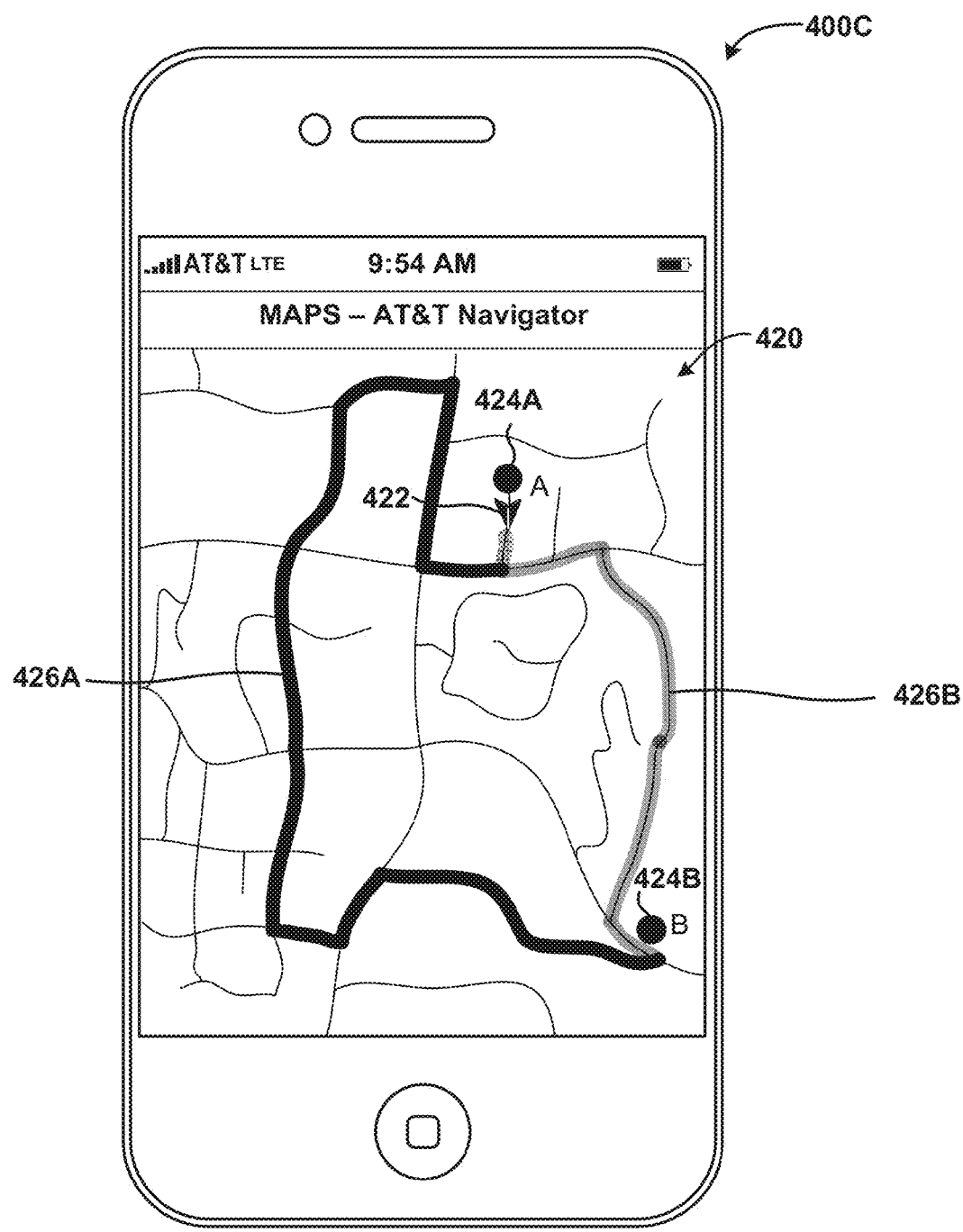
Figure 4D:
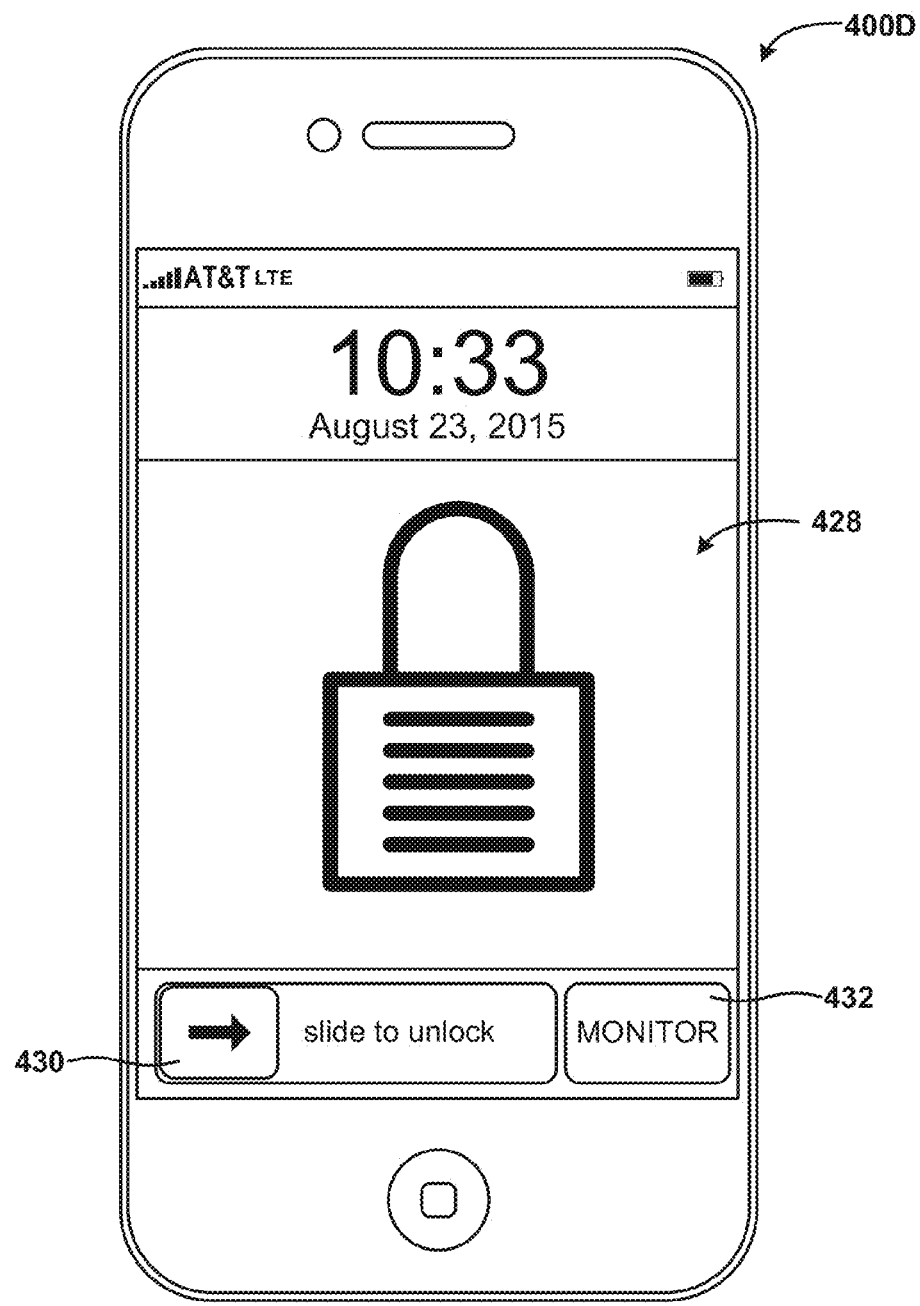
Figure 4E:
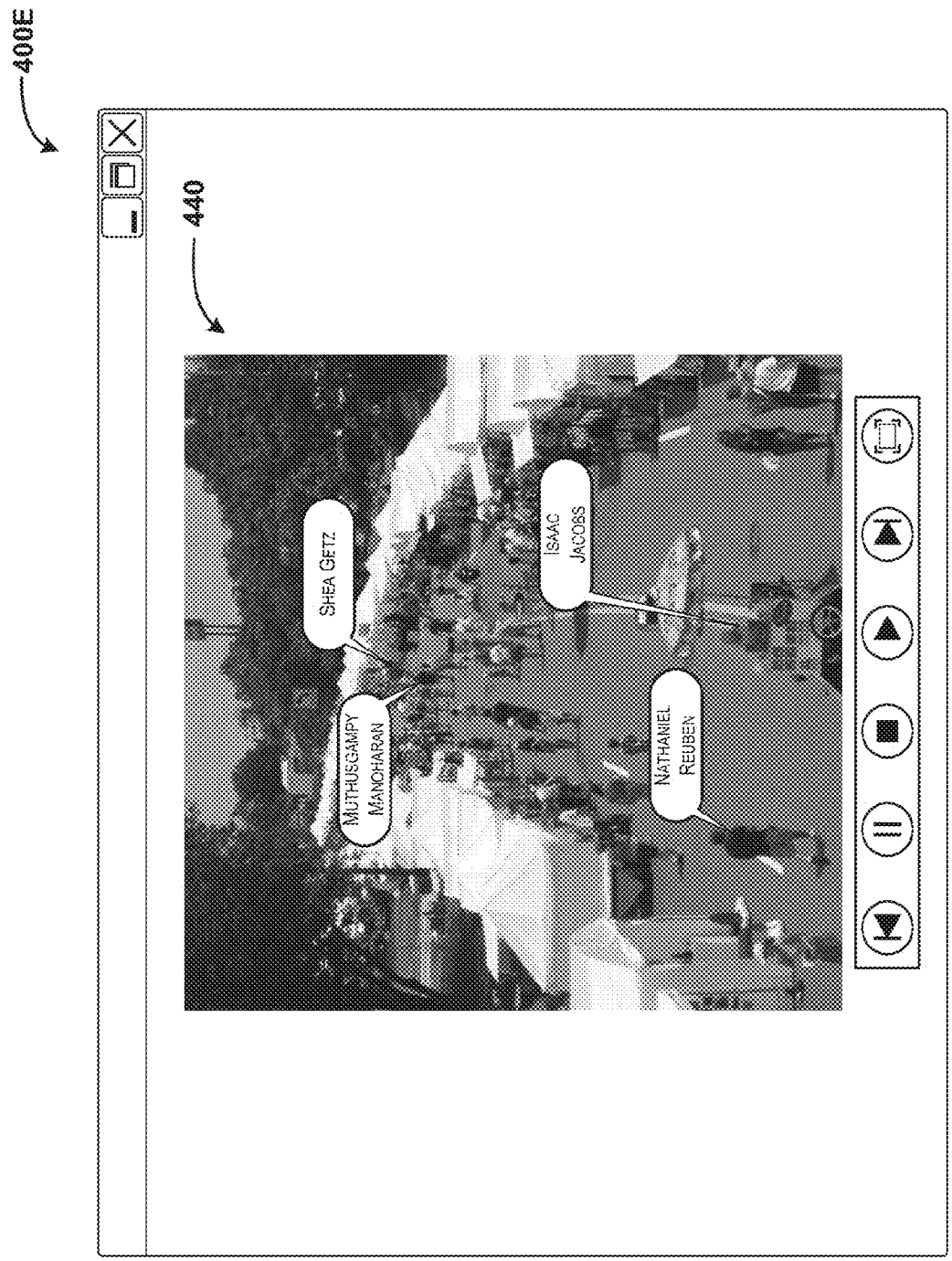
FIG. 4E is a user interface diagram illustrating a user interface for remotely monitoring a user device or entity associated with a user device, according to an illustrative embodiment.

FIGS. 4A-4E are user interface ("UI") diagrams showing aspects of UIs for interacting with, configuring, and/or providing functionality associated with a remotely activated monitoring service, according to some illustrative embodiments of the concepts and technologies described herein. FIG. 4A shows an illustrative screen display 400A generated by a device such as the user device 102. According to various embodiments, the user device 102 can generate the screen display 400A and/or other screen displays in conjunction with execution of the monitor application 108 and/or the monitoring service 110. It should be appreciated that the UI diagram illustrated in FIG. 4A is illustrative of one contemplated example of the UIs and therefore should not be construed as being limited in any way.

The screen display 400A can include various menus and/or menu options (not shown in FIG. 4A). The screen display 400A also can include a monitoring service options screen 402, which can be interacted with by a user or other entity to configure the monitor application 108 and/or the monitoring service 110. For purposes of illustrating and describing the concepts and technologies disclosed herein, the monitoring service options screen 402 is illustrated as showing a number of configurable options, which are described in additional detail below. Because options and/or settings associated with the monitor application 108 and/or the monitoring service 110 can be made in a variety of ways, it should be understood that this example is illustrative. As such, the embodiment shown in FIG. 4A should not be construed as being limiting in any way.

In the illustrated embodiment, the monitoring service options screen 402 includes a number of monitoring service settings 404A-H (hereinafter collectively and/or generically referred to as "monitoring service settings 404"). The monitoring service settings 404 can be interacted with by a user or other entity to configure and/or select various settings associated with the monitor application 108 and/or the monitoring service 110. The various example monitoring service settings 404 are described below. Because additional and/or alternative types of monitoring service settings 404 can be displayed and/or interacted with via the monitoring service options screen 402, it should be understood that the examples of the monitoring service settings 404 shown in FIG. 4A are illustrative and should not be construed as being limiting in any way.

The monitoring service setting 404A can be used to turn on or turn off the use of event-based monitoring. In the illustrated embodiment, a user can select or de-select the UI control 406A to activate or deactivate the use of event-based monitoring. It can be appreciated from the description herein that the selection or de-selection of the UI control 406A can activate or deactivate the monitor application 108 and/or the monitoring service 110 from using events occurring at the user device 102 and/or events associated with one or more users of the user device 102 to generate monitoring requests 128 and/or to configure or change settings associated with the monitor application 108 and/or the monitoring service 110. In the illustrated embodiment, the UI control 406A is illustrated as being activated, which can indicate that a user or other entity has indicated that events are to be used to request monitoring and/or for other purposes. It should be understood that this example is illustrative and therefore should not be construed as being limiting in any way.

The monitoring service setting 404B can be used to enable or disable monitoring alerts at the user device 102. As explained above, the user device 102 can be configured to execute the monitor application 108 to generate alerts or warnings at the user device 102 if a monitor-triggering event is detected at or in association with the user device 102. Because the monitoring service options screen 402 can be presented at the user device 102, it can be appreciated that the selection of the UI control 406B can cause the user device 102 to activate and/or deactivate the display of alerts at the user device 102. Because the enabling or disabling of monitoring alerts can allow or prevent display or other communication of monitoring alerts at additional and/or alternative devices, it should be understood that the illustrated example is illustrative. As such, the embodiment shown in FIG. 4A should not be construed as being limiting in any way.

The monitoring service setting 404C can be used to turn on or turn off an option to restrict data communications associated with the monitor application 108 and/or the monitoring service 110 to WiFi. Thus, selection of the UI control 406C can cause the user device 102 to activate and/or deactivate usage of cellular data networks and/or other data networks or connections for transmitting data associated with the monitor application 108 and/or the monitoring service 110 to or from the user device 102 and/or other networks, systems, and/or devices. Because other monitoring service settings 404 can be displayed for further restricting and/or configuring data communications over various networks, it should be understood that this example is illustrative and therefore should not be construed as being limiting in any way.

The monitoring service setting 404D can be used to enable or disable location-based services associated with the monitor application 108 and/or the monitoring service 110. Thus, the monitoring service setting 404D can be interacted with by a user or other entity to enable or disable the use of the location data 122 described in FIG. 1 and/or other location information. Thus, selection or deselection of the monitoring service setting 404D can cause the monitor application 108 and/or the monitoring service 110 to enable or disable the detection and/or use of location-based events when generating or detecting events that are to initiate or terminate monitoring. Thus, selection of the UI control 406D can cause the user device 102 to activate and/or deactivate usage of location data by the monitor application 108 and/or the monitoring service 110. It should be understood that this example is illustrative and therefore should not be construed as being limiting in any way.

The monitoring service setting 404E can be used to turn on or turn off usage of video devices by the monitor application 108 and/or the monitoring service 110. As explained above, the monitor application 108 and/or the monitoring service 110 can be configured to identify video-capable devices in a visual range of the user device 102. According to various embodiments, these devices can be identified by searching a database located at or in communication with the user device 102 and/or the server computer 112, by requesting identification of the video-capable devices, and/or in other ways. Users or other entities may wish to enable or disable the use of video to enhance battery life of the user device 102, to address security or privacy concerns, and/or for other reasons. Thus, selection of the UI control 406E can cause the user device 102 to activate and/or deactivate usage of video by the monitor application 108 and/or the monitoring service 110. It should be understood that this example is illustrative and therefore should not be construed as being limiting in any way.

The monitoring service setting 404F can be used to turn on or turn off sharing of monitoring data 136 with the monitor application 108 and/or the monitoring service 110. As explained above, the monitoring service 110 and/or the monitor application 108 can be configured to access monitoring hardware 132 in or near a monitored location 134, and to share monitoring data 136 generated by the monitoring hardware 132 with the monitoring service 110 and/or the monitor application 108. Users or other entities may wish to disable this capability to address privacy concerns and/or for other reasons. Thus, selection of the UI control 406F can cause the user device 102 to activate and/or deactivate sharing of the monitoring data 136 with the monitor application 108 and/or the monitoring service 110 and instead may restrict the information provided to the monitor application 108 and/or the monitoring service 110 to data obtained at the user device 102. It should be understood that this example is illustrative and therefore should not be construed as being limiting in any way.

The monitoring service setting 404G can be used to turn on or turn off an option for allowing local activation of the monitoring service 110. As explained above, the monitor application 108 and/or the monitoring service 110 can be configured to support implicitly and/or explicitly generated monitoring requests such as the monitoring requests 128. User activation can correspond to explicit monitoring requests 128. Users or other entities may wish to disable the ability to allow user-generated monitoring requests 128 for various reasons (e.g., to enhance battery life of the user device 102, to reduce data usage and/or transfers, to address security or privacy concerns, other reasons, or the like). Thus, selection of the UI control 406G can cause the user device 102 to activate and/or deactivate user-generated monitoring requests 128. It should be understood that this example is illustrative and therefore should not be construed as being limiting in any way.

The monitoring service setting 404H can be used to enable or disable a monitored routing feature associated with the monitor application 108 and/or the monitoring service 110. In particular, some embodiments of the monitor application 108 and/or the monitoring service 110 can be configured to support routing requests that route users through or near areas with monitoring hardware 132 and/or the ability to monitor the user device 102. In one embodiment, the monitor application 108 and/or the monitoring service 110 can be configured to interact with a mapping or routing application or service to provide walking, riding, driving, and/or transit directions along routes and/or through areas having a maximized amount of monitoring hardware 132.

As such, users can generate routes through or along paths having a maximized amount of monitoring available. Users or other entities may wish to disable the ability to allow monitored routing to enhance battery life of the user device 102, to reduce data usage and/or data transfer costs associated with the user device 102, to address perceived security or privacy concerns, other reasons, or the like. Thus, selection of the UI control 406H can cause the user device 102 to activate and/or deactivate monitored routing features associated with the monitor application 108 and/or the monitoring service 110. It should be understood that this example is illustrative and therefore should not be construed as being limiting in any way.

The monitoring service options screen 402 also can display a UI control 408 for indicating that configuration of the monitor application 108 and/or the monitoring service 110 is complete and a UI control 410 for indicating that a user or other entity wishes to exit the configuration screen without saving any changes made. Because other UI controls can be displayed in addition to, or instead of the illustrated examples, it should be understood that the illustrated embodiment shown in FIG. 4A is illustrative, and therefore should not be construed as being limiting in any way.

It can be appreciated that selection of the UI control 408 can cause the user device 102 to pass one or more preferences to the monitor application 108 and/or to cause the user device 102 to transmit one or more preferences to the monitoring service 110, if desired. The settings or preferences can be used, for example, in execution of operation 206 of the method 200 described above with reference to FIG. 2 and/or operation 306 of the method 300 described above with reference to FIG. 3. It should be understood that this example is illustrative and therefore should not be construed as being limiting in any way.

Referring now to FIG. 4B, a UI diagram showing additional aspects of the concepts and technologies disclosed herein for configuring and/or interacting with a remotely activated monitoring service are described in detail. In particular, FIG. 4B shows an illustrative screen display 400B generated by a device such as the user device 102. It should be appreciated that the UI diagram illustrated in FIG. 4B is illustrative of one contemplated example of a UI and therefore should not be construed as being limited in any way. As shown in FIG. 4B, the screen display 400B can be presented on a mobile computing device such as a smartphone, if desired. It should be understood that this example is illustrative, and should not be construed as being limiting in any way.

The screen display 400B can be displayed by the user device 102, for example, in response to receiving a monitoring alert 142 at the user device 102. In the illustrated embodiment, the screen display 400B includes a monitoring alert screen 412. The monitoring alert screen 412 can be displayed at the user device 102 to inform a user or other entity that the monitor application 108 and/or the monitoring service 110 has detected an event that is to initiate or terminate monitoring as described herein. It should be understood that the illustrated embodiment is illustrative of one contemplated monitoring alert screen 412 and therefore should not be construed as being limiting in any way.

The monitoring alert screen 412 can include an indication that the monitor application 108 and/or the monitoring service 110 has/have detected a monitoring request 128. In the illustrated embodiment, the indication states that an event or event data has triggered a monitoring request 128 due to particular event parameters being satisfied or failing to be satisfied. From the above description, it can be appreciated that any number of events and/or event parameters can trigger the monitoring request 128, and as such, the illustrated embodiment is merely illustrated of a single contemplated example for purposes of illustrating and describing the concepts and technologies described herein.

In the illustrated monitoring alert screen 412, two parameters are illustrated as being met or failing to be met. In particular, the illustrated monitoring alert screen 412 includes two parameter indicators 414. The illustrated parameter indicators 414 include an indication that the user device 102 and/or a user associated with the user device 102 is entering a high-crime area, e.g., an area with a high crime rate relative to other areas near the user device 102 and/or the user, and an indicator that a current time of day matches a defined parameter. With regard to the time of day, the user or another entity may specify that monitoring is to be triggered if a user enters an area with a high crime rate after nightfall or on a particular date or within a date range. As mentioned above, these examples are merely illustrative and therefore should not be construed as being limiting in any way.

The monitoring alert screen 412 also can include a UI control 416 for selecting an option to initiate monitoring of the user device 102 and/or a user associated with the user device 102. As such, selection of the UI control 416 can prompt the user device 102 to generate a monitoring request 128 as illustrated and described above. The monitoring alert screen 412 also can include a UI control 418 for indicating that a user or other entity wishes to dismiss or ignore the monitoring alert 142. Because other UI controls can be displayed in addition to, or instead of the illustrated examples, it should be understood that the illustrated embodiment shown in FIG. 4B is illustrative and should not be construed as being limiting in any way.

Turning now to FIG. 4C, a UI diagram showing additional aspects of the concepts and technologies disclosed herein for interacting with and/or providing functionality associated with a remotely activated monitoring service are described in detail. In particular, FIG. 4C shows an illustrative screen display 400C generated by and/or presented at a device such as the user device 102. It should be appreciated that the UI diagram illustrated in FIG. 4C is illustrative of one contemplated example of a UI that can be generated by the user device 102 and therefore should not be construed as being limited in any way. As shown in FIG. 4C, the screen display 400C can be presented on a mobile computing device such as a smartphone, if desired. It should be understood that this example is illustrative, and should not be construed as being limiting in any way.

The screen display 400C can include a map or route display ("map display") 420. In some embodiments, the map display 420 can be generated by the user device 102 and/or the server computer 112 in response to receiving a request to generate a route in conjunction with a monitor application 108 and/or am monitoring service 110. The map display 420 can display a navigation route. The map display 420 includes a current location indicator 422 and two location indicators 424A-B (hereinafter collectively and/or generically referred to as "location indicators 424"). Of course, the map display 420 can include two, more than two, or less than two location indicators 424. As such, it should be understood that the embodiment shown in FIG. 4C is illustrative, and should not be construed as being limiting in any way.

The two location indicators 424 can correspond, for example, to a start location and an end location, if desired. As shown in FIG. 4C, the map display 420 also can show one or more determined routes between the two or more locations corresponding to the location indicators 424. In particular, the map display 420 shows a first route 426A and a second route 426B. The first route 426A can take into account one or more routing constraints such as, for example, the presence of monitoring hardware 132 along or within monitoring range of the first route 426A. The second route 426B may correspond, for example, to a quickest, shortest, least expensive, or other route between the two locations corresponding to the location indicators 424. As shown in FIG. 4C, the map display 420 can include a visual indicator such as shading, or the like, for indicating that the first route 426A and/or the second route 426B meets or fails to meet a routing constraint. It should be understood that this embodiment is illustrative, and should not be construed as being limiting in any way.

As such, it can be appreciated that a user or other entity can use the monitor application 108 and/or the monitoring service 110 to generate one or more routes between two or more locations, taking into account the availability of monitoring hardware 132 along one or more routes between the two or more locations. As such, a monitoring request 128 such as that shown in FIG. 1 can correspond, in some embodiments, to a routing request generated by the user device 102 and/or other devices.

Turning now to FIG. 4D, a UI diagram showing additional aspects of the concepts and technologies disclosed herein for interacting with and/or providing functionality associated with a remotely activated monitoring service are described in detail. In particular, FIG. 4D shows an illustrative screen display 400D generated by and/or presented at a device such as the user device 102 via execution and/or interaction with a monitor application 108 and/or a monitoring service 110. It should be appreciated that the UI diagram illustrated in FIG. 4D is illustrative of one contemplated example of a UI that can be generated by the user device 102 and therefore should not be construed as being limited in any way. As shown in FIG. 4D, the screen display 400D can be presented on a mobile computing device such as a smartphone, if desired. It should be understood that this example is illustrative, and should not be construed as being limiting in any way.

As shown in FIG. 4D, the screen display 400D can include a lock screen 428. Because lock screens such as the lock screen 428 are generally understood, the lock screen 428 will not be described in further detail herein. The lock screen 428 can include a UI control 430 for unlocking the user device 102, a UI control 432 for generating a monitoring request 128, and/or other UI controls or options (not shown in FIG. 4D). It can be appreciated that the UI control 432 may be displayed anytime the lock screen 428 is displayed by the user device 102, in some embodiments. In some other embodiments, the UI control 432 may be displayed only if the lock screen 428 is being displayed by a user device 102 within a defined period of time after receiving a monitoring alert 142 such as the monitoring alert 142 illustrated and described in FIGS. 1 and 4B above. It should be understood that this example is illustrative and therefore should not be construed as being limiting in any way.

In some embodiments, the UI control 432 can be displayed by the user device 102 to enable a user or other entity associated with the user device 102 to activate the monitor application 108 and/or the monitoring service 110. As noted above, the UI control 432 can be displayed after the user device 102 receives a monitoring alert 142 to allow a user or other entity to activate the monitor application 108 and/or the monitoring service 110. In some embodiments, the UI control 432 can be displayed on the lock screen 428 and/or on another display presented at the user device 102 for a period of time after the user device receives the monitoring alert 142. In some embodiments, the period of time includes ten seconds, thirty seconds, one minute, five minutes, ten minutes, or another time period. It should be understood that these examples are illustrative and therefore should not be construed as being limiting in any way.

In some embodiments, the UI control 432 can be displayed on the lock screen 428 and/or on another display presented at the user device 102 as long as the user device 102 is within a defined distance of a location at which the monitoring alert 142 was received by the user device 102. As such, some embodiments of the concepts and technologies described herein include setting up a geofence when the user device 102 receives the monitoring alert 142, and presenting the UI control 432 until the user device 102 leaves an area within the geofence and/or a defined distance from the geofence. In some embodiments, the predefined distance includes one meter, ten meters, ten feet, fifty feet, fifty meters, one hundred feet, one hundred meters, a tenth of a mile, one mile, or another distance. It should be understood that these examples are illustrative and therefore should not be construed as being limiting in any way.

Selection of the UI control 432 via the lock screen 428 can prompt the user device 102 to generate a monitoring request 128, if desired. As such, it can be appreciated that a user or other entity can access the functionality described herein for interacting with and/or activating a remotely activated monitoring service even if the user device 102 is locked. Thus, embodiments of the concepts and technologies described herein can provide a user or other entity with the ability to easily and/or quickly activate and/or request activation of the monitoring service 110 and/or the monitor application 108. It should be understood that these examples are illustrative and therefore should not be construed as being limiting in any way.

Turning now to FIG. 4E, a UI diagram showing additional aspects of the concepts and technologies disclosed herein for interacting with and/or providing functionality associated with a remotely activated monitoring service are described in detail. In particular, FIG. 4E shows an illustrative screen display 400E generated by and/or presented at a device such as the server computer 112 via execution and/or interaction with a monitoring service 110 and/or monitoring hardware 132. It should be appreciated that the UI diagram illustrated in FIG. 4E is illustrative of one contemplated example of a UI that can be generated by the sever computer 112 and therefore should not be construed as being limited in any way.

As shown in FIG. 4E, the screen display 400E can include a video signal or data ("video") 440. The server computer 112 can analyze the video 440 as part of analyzing the monitoring data 136 as described above with reference to FIG. 3. The server computer 112 can generate an overlay for the video 440 and/or embed data in the video 440 for labeling people in the video 440. Thus, a monitor or technician can watch the user who has requested monitoring and/or spot the user in the video in circumstances in which multiple users are present. It should be understood that this example is illustrative, and should not be construed as being limiting in any way.

Figure 5:
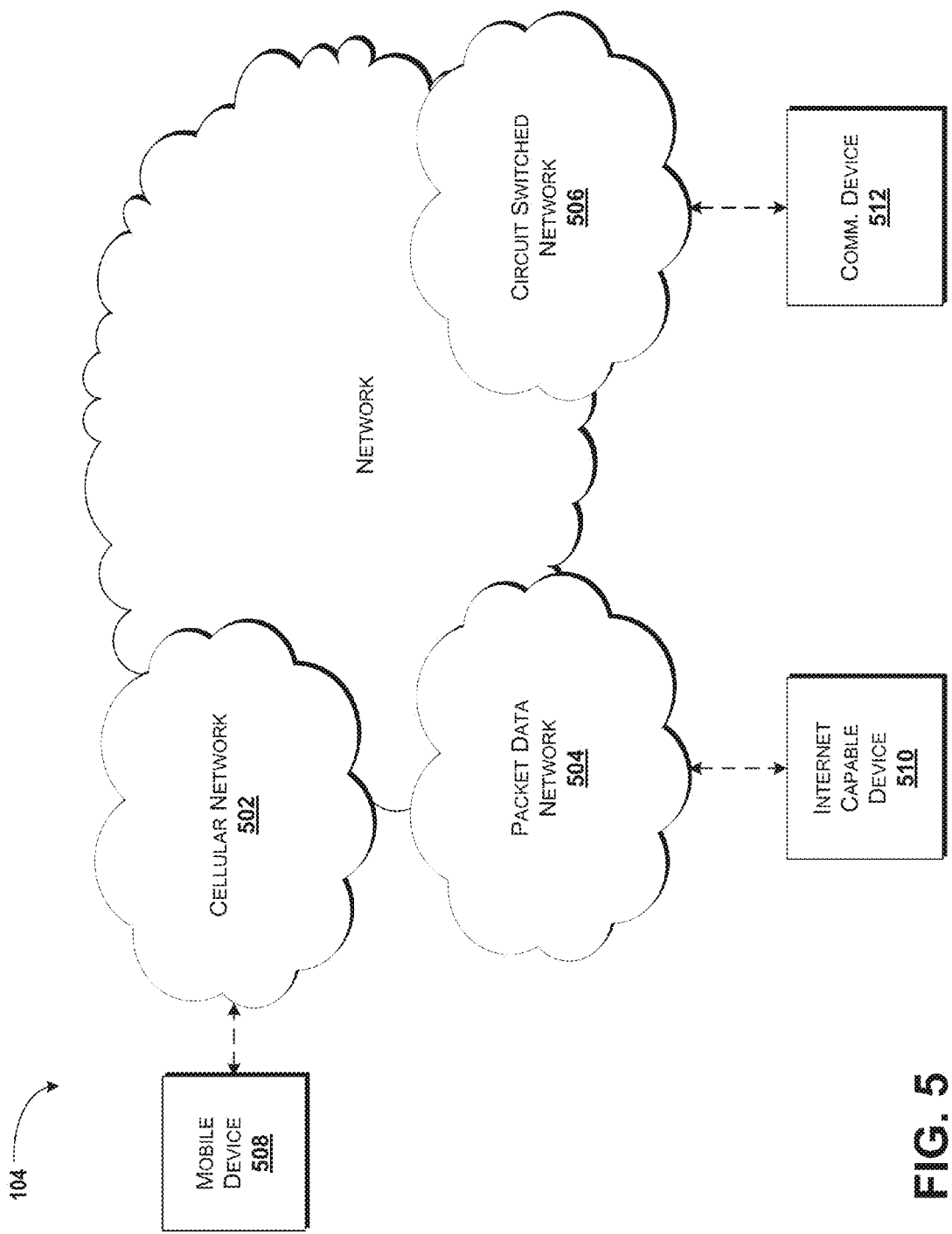
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards such as LTE, or the like, as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations of the concepts and technologies described herein, the user device 102 can use any combination of the devices disclosed herein including, but not limited to, the mobile device 508, the Internet capable device 510, and/or the communication device 512 to access web pages or other resources; to access the server computer 112; to transmit and/or receive the event data 114; to transmit and/or receive the monitoring requests 128 and/or the monitoring alerts 142; and/or for other interactions between the user device 102 and the server computer 112. As such, it should be understood that the user device 102 can interact with the server computer 112 via any number and/or combination of devices and networks. It should be understood that these examples are illustrative and therefore should not be construed as being limiting in any way.

Figure 6:
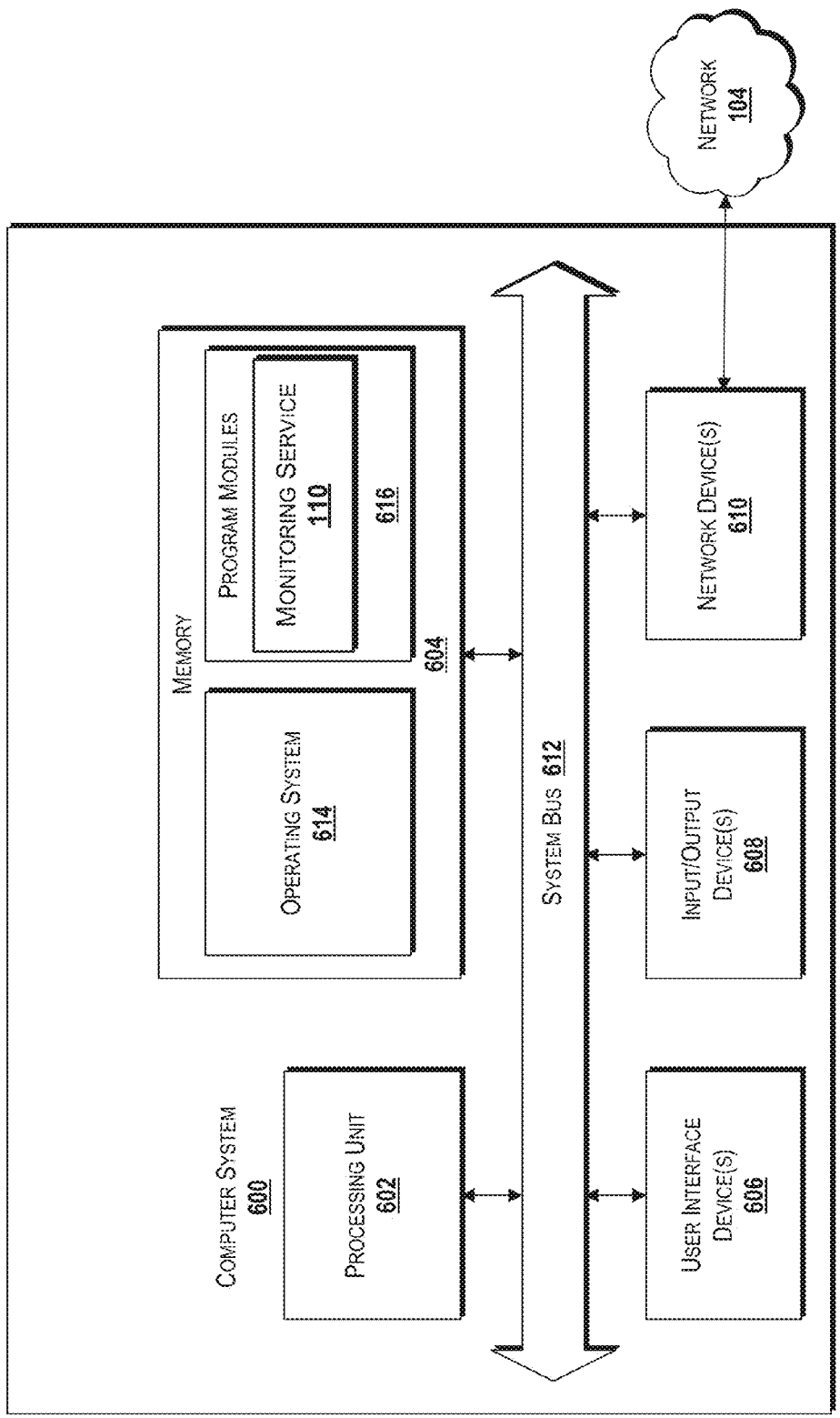
FIG. 6 is a block diagram illustrating an example computer system configured to provide functionality associated with a remotely activated monitoring service, according to some illustrative embodiments.

FIG. 6 is a block diagram illustrating a computer system 600 configured to provide the functionality described herein for providing and/or interacting with a remotely activated monitoring service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the monitoring service 110. This and/or other programs can be embodied in computer-readable media containing instructions that, when executed by the processing unit 602, perform one or more of the methods 200, 300 described in detail above with respect to FIGS. 2-3. According to some embodiments, the program modules 616 may be embodied in hardware, software, firmware, or any combination thereof. Additionally, the program modules 616 can be distributed across multiple data storage devices and/or executed by multiple processing devices, in some implementations. Although not shown in FIG. 6, it should be understood that the memory 604 also can be configured to store the event data 114, the monitoring requests 128, the commands 130, the monitoring data 136, the action data 140, the monitoring alerts 142, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media as defined herein.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WiFi network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
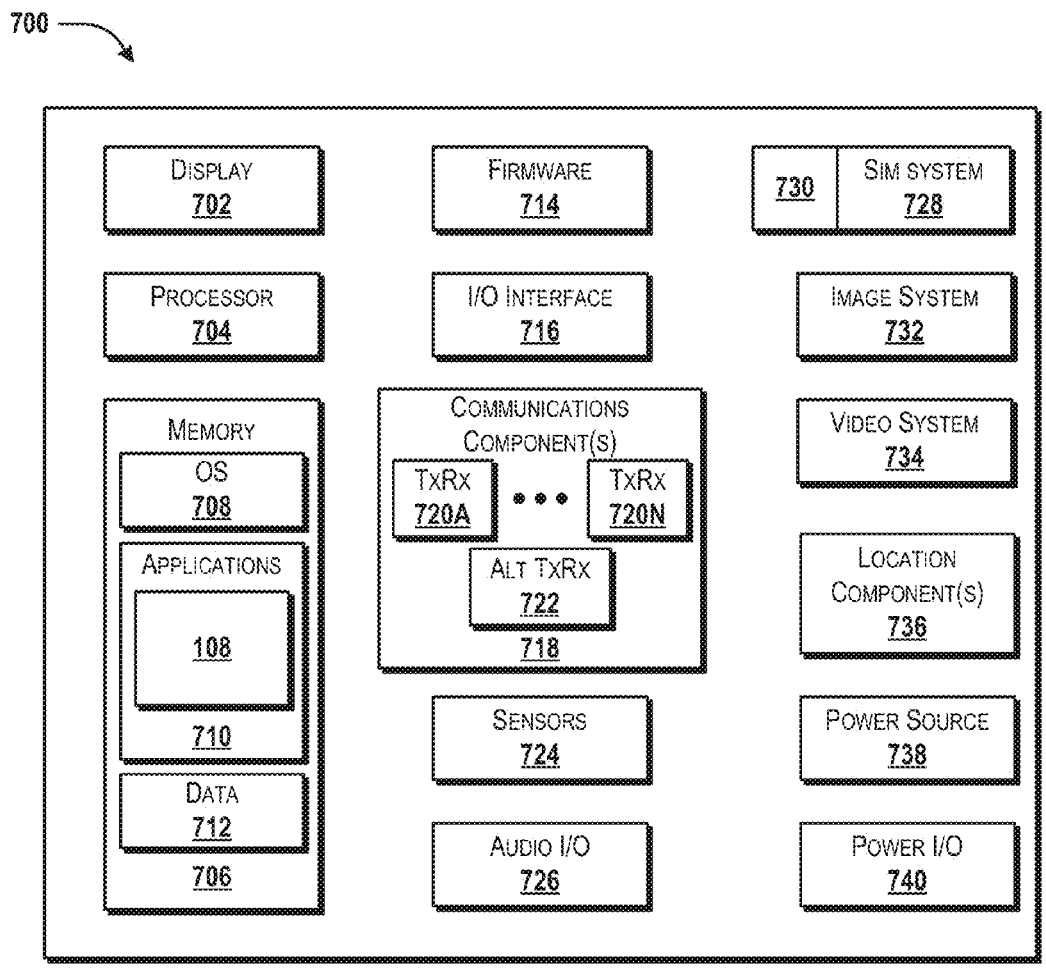
FIG. 7 is a block diagram illustrating an example mobile device configured to interact with a remotely activated monitoring service, according to some illustrative embodiments.

Turning now to FIG. 7, an illustrative mobile device 700 and components thereof will be described. In some embodiments, the user device 102 described above with reference to FIGS. 1-5 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display monitoring information, monitoring alerts, account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the monitor application 108, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, answering/initiating calls, entering/deleting data, entering and setting user IDs and passwords for device access, configuring settings, manipulating address book content and/or settings, displaying monitoring alerts 142, generating monitoring requests 128, configuring and/or interacting with the monitor application 108 and/or the monitoring service 110, multimode interactions, interacting with other applications 710, and otherwise facilitating user interaction with the operating system 708, the applications 710, and/or other types or instances of data 712 that can be stored at the mobile device 700. The data 712 can include, for example, event data 114, monitoring data 136, action data 140, and/or other applications or program modules.

According to various embodiments, the data 712 can include, for example, presence applications, visual voice mail applications, messaging applications, text-to-speech and speech-to-text applications, add-ons, plug-ins, email applications, music applications, video applications, camera applications, monitoring or security applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, monitoring information, video or images, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700.

In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WiFi or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, LTE, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WiFi, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WiFi hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WiFi/WIMAX and/or cellular network triangulation data, combinations thereof, and the like. The location component 736 also can be configured to communicate with the communications component 718 to retrieve triangulation data for determining a location of the mobile device 700.

In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing a remotely activated monitoring service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   determining, by a server computer that executes a monitoring service, that monitoring of a user device and a proximity of the user device is to be initiated;
   determining, by the server computer, a geographic location of the user device; identifying, by the server computer, monitoring hardware that is within a detection range of a monitored location associated with the geographic location, wherein the user device is located at the monitored location, and wherein the proximity of the user device to be monitored is located at the monitored location;
   issuing, by the server computer, a command to the monitoring hardware to initiate monitoring of the user device and the proximity of the user device by the monitoring hardware; receiving, by the server computer, a request to provide directions along a route that has a maximized amount of monitoring hardware: and
   providing, by the server computer, the directions along the route that has the maximized amount of monitoring hardware.

2. The method of claim 1, further comprising:
determining, by the server computer, if a prompt is to be generated at the user device;
in response to a determination that the prompt is to be generated,
generating, by the server computer, a monitoring alert, and
transmitting, by the server computer, the monitoring alert to the user device; and
obtaining, by the server computer, input indicating that the monitoring is to be initiated.

3. The method of claim 1, further comprising:
obtaining, by the server computer, monitoring data generated by the monitoring hardware;
analyzing, by the server computer, the monitoring data to determine if an action is to be taken; and
in response to a determination that the action is to be taken,
generating, by the server computer, action data indicating an action to be taken, and
transmitting, by the server computer, the action data to an entity.

4. The method of claim 1, further comprising detecting a monitoring request generated by the user device.

5. The method of claim 1, wherein the monitoring hardware comprises a video device, and wherein the monitored location is within a visual range of the video device.

6. The method of claim 1, wherein the monitoring hardware is located remote from the monitored location, and wherein the monitoring hardware comprises a network device that identifies the user device.

7. The method of claim 1, wherein determining that the monitoring of the user device and the proximity of the user device is to be initiated comprises receiving a monitoring request from the user device via a wireless connection, and wherein issuing the command comprises issuing the command to the monitoring hardware via a wired connection.

8. The method of claim 1, further comprising interacting with a service to obtain the directions.

9. The method of claim 1, wherein the monitoring comprises monitoring an entity associated with the user device.

10. The method of claim 9, wherein the entity comprises a user associated with the user device, wherein the monitoring hardware comprises a video device, wherein the monitored location is within a visual range of the video device, and wherein video generated by the video device during the monitoring comprises an image of the user.

11. A system comprising: a processor; and
a memory storing computer-executable instructions that, when executed by the processor, cause the processor to perform operations comprising
determining that monitoring of a user device and a proximity of the user device is to be initiated,
determining a geographic location of the user device,
identifying, based on the geographic location, monitoring hardware that is within a detection range of a monitored location associated with the geographic location, wherein the user device is located at the monitored location, and wherein the proximity of the user device to be monitored is located at the monitored location,
issuing, by the server computer, a command to the monitoring hardware to initiate monitoring of the user device and the proximity of the user device by the monitoring hardware;
receiving a request to provide directions along a route that has a maximized amount of monitoring hardware, and
providing the directions along the route that has the maximized amount of monitoring hardware.

12. The system of claim 11, further comprising a data store that stores event data generated by the monitoring service, the event data comprising:
preferences associated with the user device and the monitoring service;
event definitions that define conditions in which monitoring of the user device and the proximity of the user device is to be initiated;
location data defining locations at which monitoring of the user device and the proximity of the user device is to be initiated; and
user data comprising data describing a user associated with the user device.

13. The system of claim 11, wherein the computer-executable instructions, when executed by the processor, cause the processor to perform operations further comprising:
obtaining monitoring data generated by the monitoring hardware;
analyzing the monitoring data to determine if an action is to be taken; and
in response to a determination that the action is to be taken,
generating action data indicating an action to be taken, and
transmitting the action data to an entity.

14. The system of claim 11, wherein the computer-executable instructions, when executed by the processor, cause the processor to perform operations further comprising:
interacting with a service to obtain the directions.

15. A computer storage medium having computer-executable instructions stored thereon that, when executed by a processor, cause the processor to perform operations comprising:
determining that monitoring of a user device and a proximity of the user device is to be initiated;
determining a geographic location of the user device;
identifying, based on the geographic location, monitoring hardware that is within a detection range of a monitored location associated with the geographic location, wherein the user device is located at the monitored location, and wherein the proximity of the user device to be monitored is located at the monitored location;
issuing a command to the monitoring hardware to initiate monitoring of the user device and the proximity of the user device by the monitoring hardware;
receiving a request to provide directions along a route that has a maximized amount of monitoring hardware; and
providing the directions along the route that has the maximized amount of monitoring hardware.

16. The computer storage medium of claim 15, wherein the computer-executable instructions, when executed by the processor, cause the processor to perform operations further comprising:
obtaining monitoring data generated by the monitoring hardware;
analyzing the monitoring data to determine if an action is to be taken; and
in response to a determination that the action is to be taken,
generating action data indicating an action to be taken, and
transmitting the action data to an entity.

17. The computer storage medium of claim 15, wherein the computer-executable instructions, when executed by the processor, cause the processor to perform operations further comprising:
   obtaining event data generated by a monitoring service; and
   storing the event data at a data store, the event data being stored with data that associates the event data with the user device.

18. The computer storage medium of claim 15, wherein the computer-executable instructions, when executed by the processor, cause the processor to perform operations further comprising:
   determining that a prompt is to be generated at the user device;
   in response to a determination that the prompt is to be generated,
      generating a monitoring alert, and
      transmitting the monitoring alert to the user device; and
   obtaining input from the user device, the input indicating that the monitoring is to be initiated.

19. The computer storage medium of claim 15, wherein the computer-executable instructions, when executed by the processor, cause the processor to perform operations further comprising:
   obtaining monitoring data generated by the monitoring hardware;
   analyzing the monitoring data to determine if an action is to be taken; and
   in response to a determination that the action is to be taken,
      generating action data indicating an action to be taken, and
      transmitting the action data to an entity.

20. The computer storage medium of claim 15, wherein the computer-executable instructions, when executed by the processor, cause the processor to perform operations further comprising:
   interacting with a service to obtain the directions.

* * * * *